(12) United States Patent
Palaka et al.

(10) Patent No.: US 10,773,657 B2
(45) Date of Patent: Sep. 15, 2020

(54) REMOVABLE ELECTRONIC DEVICE HOLDER

(71) Applicant: Calsonic Kansei North America, Inc., Farmington Hills, MI (US)

(72) Inventors: Sanjeeva Rao Palaka, Farmington Hills, MI (US); Abraham Camacho-Montoya, Farmington Hills, MI (US)

(73) Assignee: CALSONIC KANSEI NORTH AMERICA, INC., Farmington Hills, MI (US)

( * ) Notice: Subject to any disclaimer, the term of this patent is extended or adjusted under 35 U.S.C. 154(b) by 0 days.

(21) Appl. No.: 16/185,919

(22) Filed: Nov. 9, 2018

(65) Prior Publication Data
US 2020/0148130 A1    May 14, 2020

(51) Int. Cl.
*B60R 11/02* (2006.01)
*H02J 7/02* (2016.01)
*H02J 7/00* (2006.01)
*B60R 11/00* (2006.01)

(52) U.S. Cl.
CPC .......... *B60R 11/0241* (2013.01); *B60R 11/00* (2013.01); *H02J 7/0042* (2013.01); *H02J 7/025* (2013.01); *B60R 2011/0007* (2013.01); *B60R 2011/0071* (2013.01)

(58) Field of Classification Search
CPC ......... B60R 11/0241; B60R 2011/0007; B60R 2011/0071; B60R 11/00; B60R 11/02
USPC ........................................ 248/451, 310, 311
See application file for complete search history.

(56) References Cited

U.S. PATENT DOCUMENTS

| | | | | |
|---|---|---|---|---|
| 1,756,677 A * | 4/1930 | Cook | ...................... | F42B 39/02 224/245 |
| 5,588,055 A * | 12/1996 | Williamson | ........ | B60R 11/0241 379/426 |
| 5,897,090 A * | 4/1999 | Smith | ........................ | B01L 9/06 206/306 |
| 6,182,936 B1 * | 2/2001 | Yang | ........................ | B42F 9/001 211/45 |
| 6,367,761 B1 * | 4/2002 | Suzuki | ................. | A47B 21/045 24/67.11 |
| 6,491,194 B2 * | 12/2002 | Marvin | ............... | B60R 11/0241 224/247 |
| 7,469,951 B2 | 12/2008 | Welschholz et al. | | |
| 7,708,328 B2 * | 5/2010 | Doom | ........................ | B60R 7/06 206/565 |

(Continued)

*Primary Examiner* — Nkeisha Smith
(74) *Attorney, Agent, or Firm* — Foley & Lardner LLP

(57) ABSTRACT

An electronic device holder that is configured to hold at least one electronic device includes a wall structure and a hook structure. The electronic device has a first side and a second side that are opposite each other. The wall structure includes a main wall and at least one biasing member. The main wall is configured to support and abut the second side of an electronic device. The biasing member projects from the main wall and is configured to bias the electronic device away from the main wall. The biasing member is configured to extend along and abut at least a portion of the second side of the electronic device. The hook structure is configured to secure the electronic device. The hook structure includes an end portion that is configured to support and abut at least a portion of the first side of the electronic device.

15 Claims, 15 Drawing Sheets

(56) References Cited

U.S. PATENT DOCUMENTS

| | | | | |
|---|---|---|---|---|
| 9,097,489 B2* | 8/2015 | Chiang | ............... | F42B 39/02 |
| 9,783,124 B2* | 10/2017 | Catlin | ............... | B60R 11/0241 |
| 9,986,803 B2* | 6/2018 | Clark | ............... | A45C 11/00 |
| 10,455,955 B2* | 10/2019 | Jacobson | ............... | A47B 97/00 |
| 10,486,615 B1* | 11/2019 | Shibata | ............... | B60R 11/0241 |
| 10,493,922 B2* | 12/2019 | Perez | ............... | B60R 11/0241 |
| 2002/0100782 A1* | 8/2002 | Marvin | ............... | B60R 11/0241 |
| | | | | 224/483 |
| 2015/0375685 A1 | 12/2015 | Krishnan et al. | | |
| 2017/0144613 A1* | 5/2017 | Catlin | ............... | B60R 11/0241 |
| 2018/0201197 A1* | 7/2018 | Gaw, Jr. | ............... | B60R 11/02 |
| 2019/0184907 A1* | 6/2019 | Weintraub | ............... | B60R 7/08 |

* cited by examiner

US 10,773,657 B2

REMOVABLE ELECTRONIC DEVICE HOLDER

BACKGROUND

The present application relates generally to the field of electronic device holders for use within a vehicle.

Drivers and passengers of vehicles often struggle with issues relating to where to place and/or charge their electronic devices (e.g., mobile phones) When a vehicle is being operated. Many times, such electronic devices will be placed into cup holders or other storage areas within the passenger compartment, although such spaces are not necessarily ideally configured for retaining these types of devices. Moreover, it is difficult to completely secure the electronic devices in place so that the electronic devices do not from move or become a projectile object within the vehicle. It would be advantageous to provide a better solution for securing electronic devices within a vehicle compartment.

SUMMARY

An exemplary embodiment relates to an electronic device holder that is configured to hold at least one electronic device includes a wall structure and a hook structure. The electronic device has a first side and a second side that are opposite each other. The wall structure includes a main wall and at least one biasing member. The main wall is configured to support and abut the second side of an electronic device. The biasing member projects from the main wall and is configured to bias the electronic device away from the main wall. The biasing member is configured to extend along and abut at least a portion of the second side of the electronic device. The hook structure is configured to secure the electronic device. The hook structure includes an end portion that is configured to support and abut at least a portion of the first side of the electronic device.

DETAILED DESCRIPTION

Referring to the figures generally, the various embodiments disclosed herein relate to an electronic device holder that securely supports and retains one or more electronic devices within a vehicle.

Figure 1:
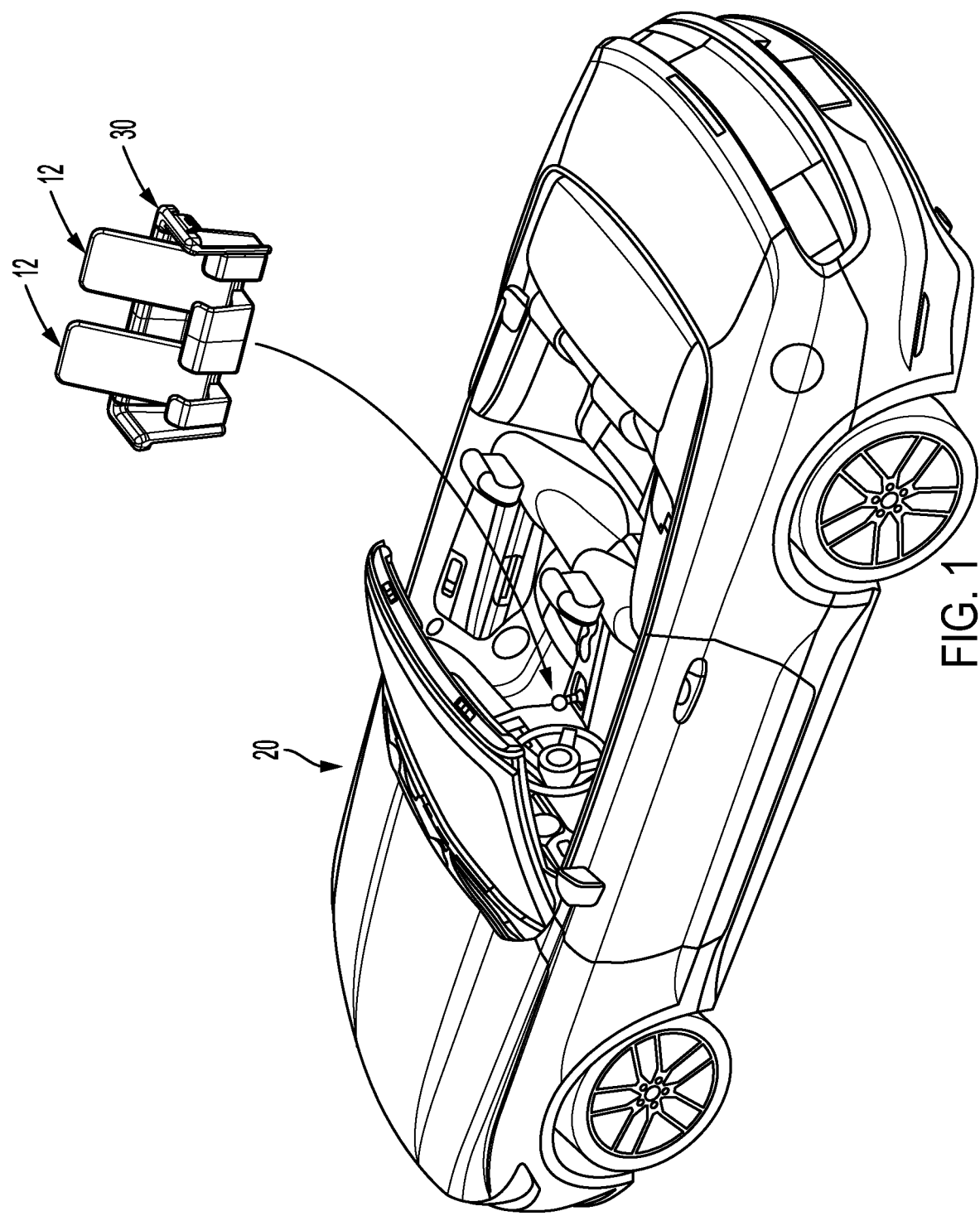
FIG. 1 is a perspective, exploded view of a vehicle and an electronic device holder according to an exemplary embodiment.
Figure 2:
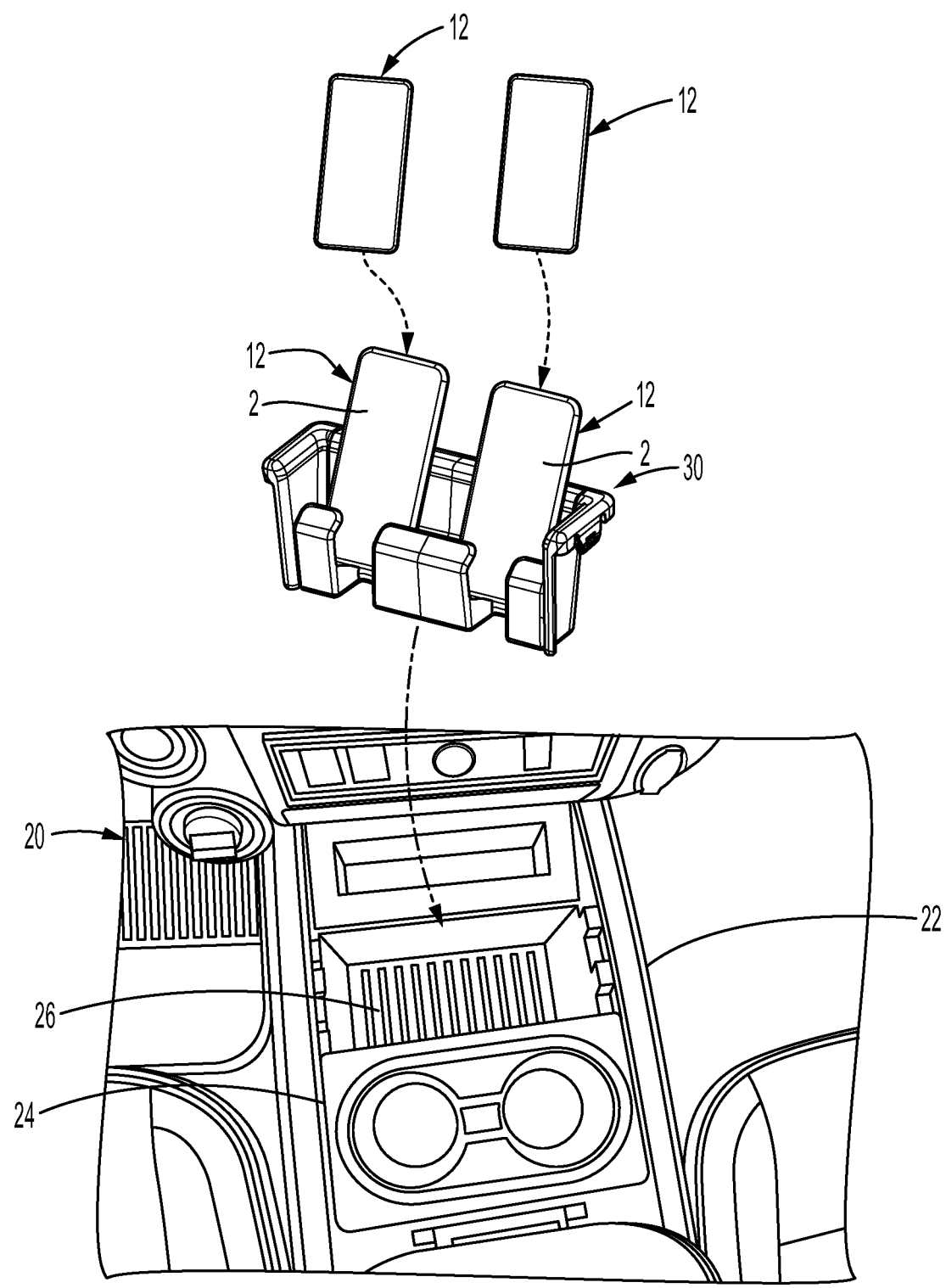
FIG. 2 is a perspective view illustrating the insertion of electronic devices into the electronic device holder of FIG. 1, and the insertion of the electronic device holder into a vehicle console according to an exemplary embodiment.

As shown in FIG. 1, a removable electronic device holder 30 is configured to be positioned and used within an interior area of a vehicle 20 to secure and hold at least one electronic device 12. As shown in FIG. 2, at least one electronic device 12 is positioned within the electronic device holder 30 (for example, two electronic devices 12, each oriented in a vertical, portrait orientation), and the electronic device holder 30 is positioned at least partially within and attached to a portion of the vehicle 20, such as a vehicle component (e.g., a center console 22). Although a center console 22 is referred to herein, the electronic device holder 30 may be positioned at least partially within or attached to a variety of other different vehicle components or areas within the vehicle, including but not limited to the instrument panel or the dashboard, depending on where electronic device storage is desired.

Figure 3:
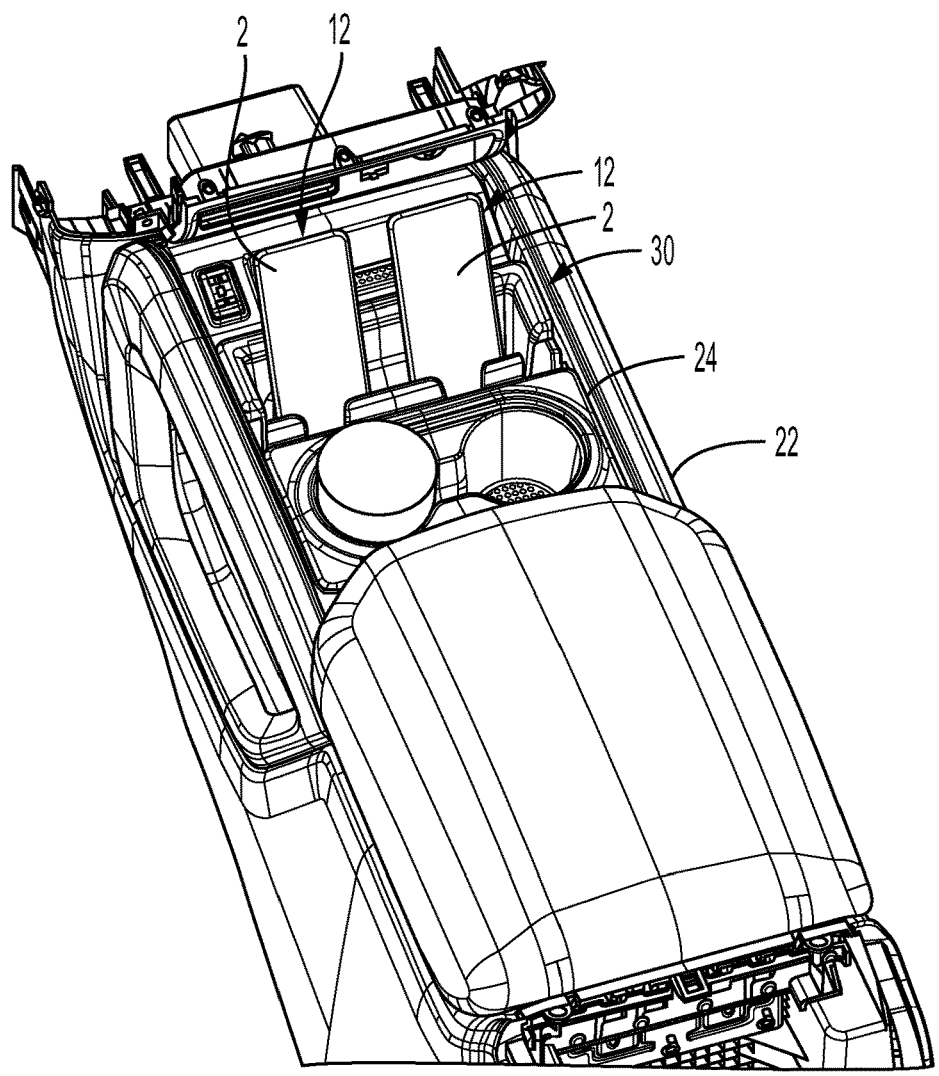
FIG. 3 is a perspective view of the electronic device holder of FIG. 1 within a center console of a vehicle.
Figure 4:
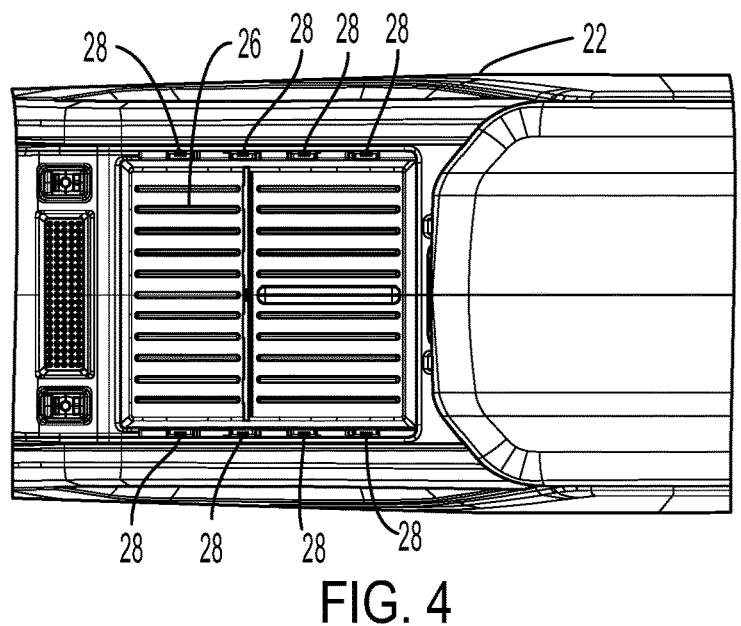
FIG. 4 is a top view of the center console of FIG. 3 without the electronic device holder.

As shown in FIGS. 2-3, the electronic device holder 30 is attachable to a portion of the center console 22. The electronic device holder 30 may attach to an area of the center console 22 that is near or adjacent cup holders 24 (as shown in FIG. 3) and/or a storage area 26 (as shown, for example, in FIG. 4). According to one particular embodiment as shown in FIG. 4, the storage area 26 may be positioned at least partially beneath the electronic device holder 30 (and optionally within the center console 22), and optionally also extend beneath the cup holder 24. The storage area 26 can be at least partially accessed when the electronic device holder 30 (and optionally the cup holder 24) is removed from or moved along the center console 22, as shown in FIG. 4. The electronic device holder 30 may utilize the same attachment features (e.g., the clip 49, as shown and described further herein) as the cup holders 24 to attach to the same areas along the center console 22 as the cup holders 24 and to be removable from and re-attachable to the center console 22. It should be noted that the configuration of the cupholders and storage areas may vary widely based on a number of factors, including the aesthetic and functional design of the center console area.

Figure 11:
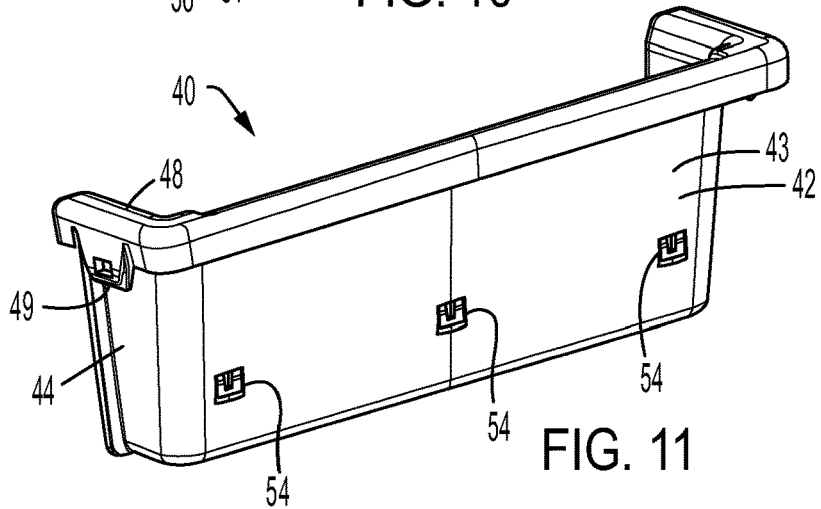
FIG. 11 is a back perspective view of the support structure of FIG. 10.

The electronic device holder 30 is configured to be re-positionable within the storage area 26 shown in FIG. 4. For example, the position of the electronic device holder 30 along the center console 22 may also be adjusted such that the electronic device holder 30 is closer to or further from the front or back of the center console 22. As illustrated in FIG. 4, the storage area 26 includes tabs 28 configured for coupling the electronic device holder 30 therein (e.g., by mating with complementary features (i.e., the clips 49, as shown in FIG. 11 and described further herein) on the electronic device holder 30), and the electronic device holder 30 may be positioned toward the front of the storage area 26, toward the rear of the storage area 26, or at select locations therebetween. In the embodiment shown in FIG. 4, there are four pairs of tabs 28 (i.e., eight total tabs 28) shown that correspond to four discrete locations where the electronic device holder 30 may be positioned within the storage area 26, although there may be a greater or lesser number of tabs 28 or other coupling structures according to other exemplary embodiments.

According to other exemplary embodiments, the electronic device holder 30 may also be removably attachable at various other locations within a vehicle other than the center console if suitable storage areas and coupling mechanisms are provided. Accordingly, the electronic device holder 30 is removable from and re-attachable to the various interior components of the vehicle (e.g., the center console 22). For example, the entire electronic device holder 30 may optionally be attached to one area within the vehicle 20, removed from the one area, moved, and subsequently fixed to another area within the vehicle 20 (such as a different position along the center console 22).

According to another exemplary embodiment, the electronic device holder 30 may be static, fixed, and not movable within the vehicle or relative to the center console 22. In such a configuration, the electronic device holder may be integrally formed with other vehicle components (e.g., a center console storage structure) or may be produced separately and coupled thereto using suitable fasteners (e.g., press-fit, screws or bolts, adhesives, snap-fits, etc.).

One advantage of the configuration of the electronic device holder 30 is that electronic devices will be held securely in place, allowing the electronic device holder 30 to be oriented in a variety of different orientations relative to the vehicle 20, according to the user's preference. For example, the electronic device holder 30 (and thus the first side 2 of the electronic device 12) may face the front of the vehicle 20 (such that the hook structure 90 is closer to the front of the vehicle 20 than the wall structure 60, both of which are described further herein) or may face the back of the vehicle 20 (such that the wall structure 60 is closer to the front of the vehicle 20 than the hook structure 90), depending on how the user would like to view the electronic device 12 (that is within the electronic device holder 30) within the vehicle 20. Alternatively, the electronic device holder 30 (and thus the first side 2 of the electronic device 12) may face either side of the vehicle 20 (such that the hook structure 90 is closer to one side of the vehicle 20 than the wall structure 60).

Figure 5:
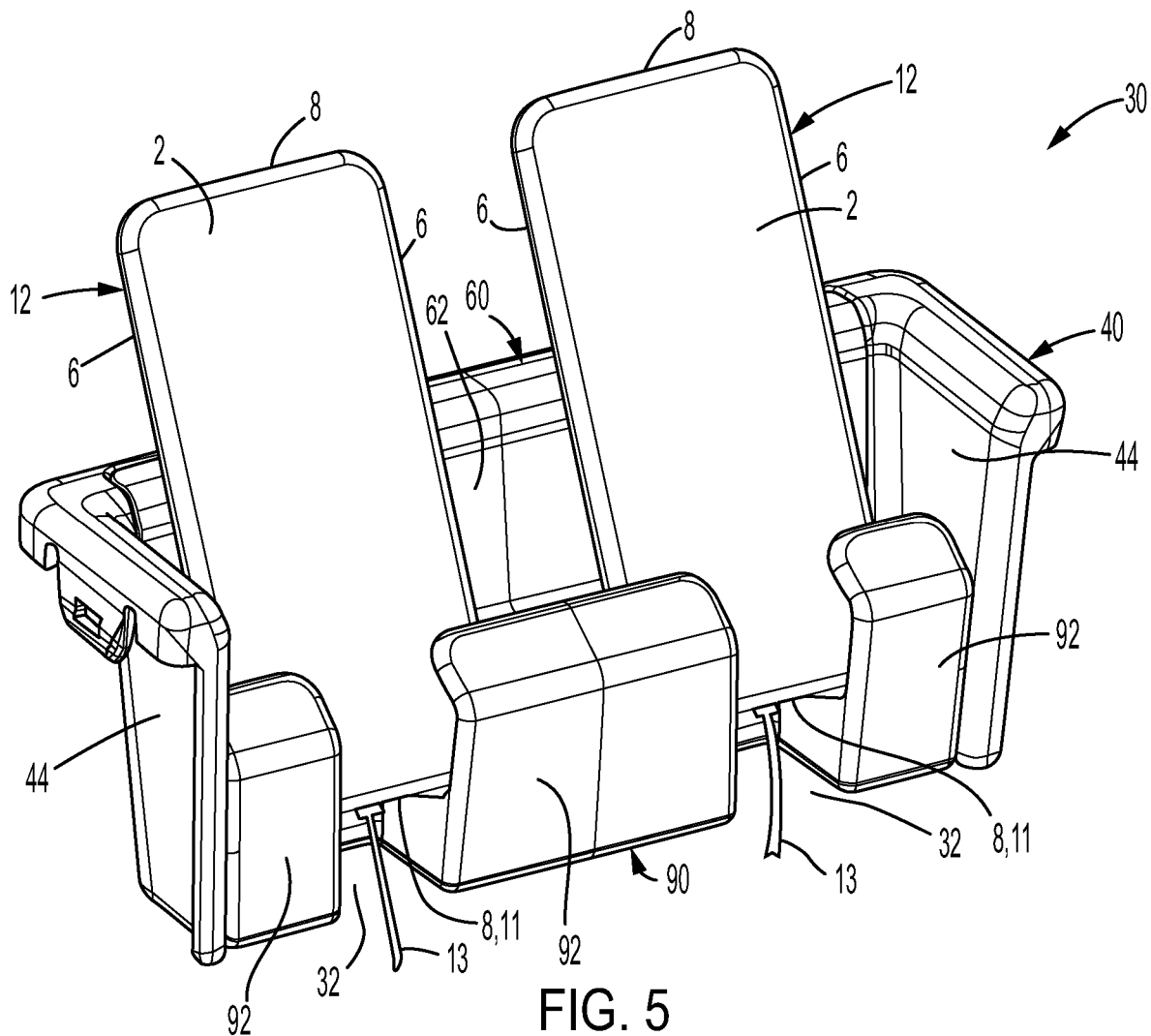
FIG. 5 is a front perspective view of the electronic device holder of FIG. 1 holding two electronic devices.

As shown in FIG. 5, the electronic device holder 30 is configured to receive, hold, secure, and store at least one electronic device 12 (e.g., a wireless device, a phone, or a tablet). As described further herein, the electronic device holder 30 positions the electronic device 12 at an angle and allows the majority of a first side 2 of the electronic device 12 to be both readily accessible and unobscured, which allows the user to easily access, watch, operate, and use the electronic device 12 while the electronic device 12 is held and secured within the electronic device holder 30.

Figure 26:
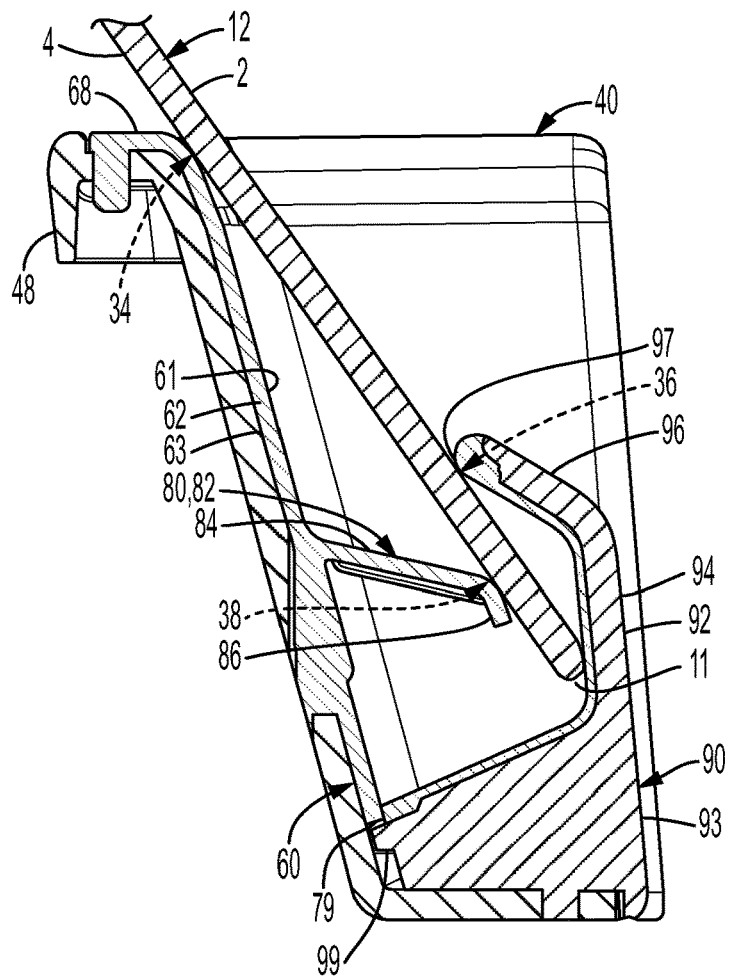
FIG. 26 is a cross-sectional view of the electronic device holder of FIG. 1 with an electronic device.
Figure 27:
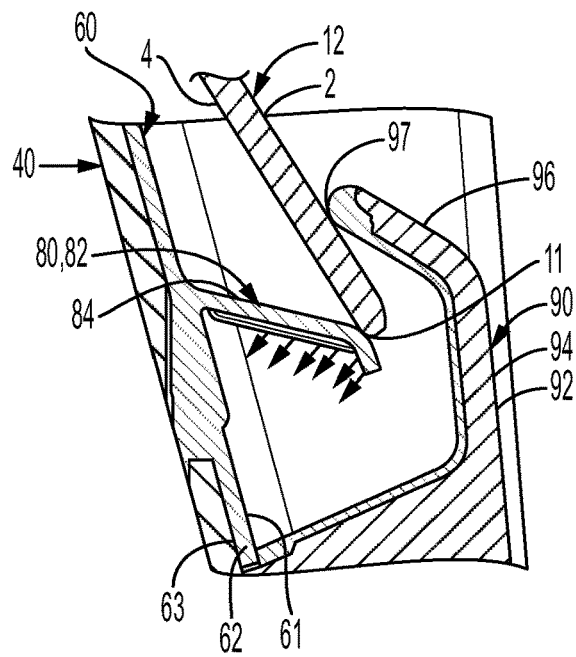
FIG. 27 is a cross-sectional view of an electronic device being inserted into the electronic device holder of FIG. 1.

As shown in FIG. 5, the electronic device 12 includes a front side or face, a back side or face, two long edges 6, and two short edges 8. The front and back faces are opposite each other and surrounded by the long edges 6 and the short edges 8. The front face of the electronic device 12 may be, for example, the primary screen of the electronic device 12. The front and back faces each correspond to one of the first and second sides 2, 4 of the electronic device 12, depending on the orientation of the electronic device 12 within the electronic device holder 30. The first side 2 of the electronic device 12 is the side of the electronic device 12 that faces toward the hooks 92 and is either the front face or the back face of the electronic device 12 (preferably the front face). The second side 4 of the electronic device is the side of the electronic device 12 that faces toward the main wall 62 of the wall structure 60 and is the other of the front face or the back face of the electronic device 12 (preferably the back face), as shown in FIGS. 26-27.

The long edges 6 are opposite each other, and the short edges 8 are opposite each other. The long edges 6 and the short edges 8 each extend between the front face and the back face (i.e., between the first side 2 and the second side 4). The long edges 6 and the short edges 8 of the electronic device 12 are substantially smaller in surface area than the first side 2 and the second side 4. The long edges 6 are longer than the short edges 8, although the long edges 6 and the short edges 8 may have the same width. The electronic device 12 may be a variety of different sizes and may or may not include an outer protective case.

The electronic device holder 30 is configured to secure and store the electronic device 12 in multiple orientations (i.e., in a landscape orientation or a portrait orientation) between the wall structure 60 and the hook structure 90 (as described further herein). The vertical orientation may be either a portrait orientation (as shown in FIG. 5) or a landscape orientation, depending on the user's desired orientation of the electronic device 12. Accordingly, the longitudinal length of the electronic device holder 30 (i.e., the longitudinal length of the usable storage area provided by the electronic device holder 30, which is the distance between the inner sides of the two side walls 44) is larger than the long edge 6 of the electronic device 12 to be able to fit the electronic device in the landscape orientation. If the electronic devices 12 are oriented in the portrait orientation, the electronic device holder 30 may be sized and configured to hold and secure two electronic devices 12 (which may be different sizes, with or without their respective outer protective cases) at the same time. Comparatively, if an electronic device 12 is orientated in the landscape orientation, the electronic device holder 30 may be sized and configured to only hold and secure one electronic device 12 at a time. However, electronic device holder 30 may be alternatively sized to fit a larger number of electronic devices 12 in the portrait or landscape orientation.

To be vertically oriented within the electronic device holder 30, one long edge 6 or one short edge 8 of the electronic device 12 is inserted first (i.e., as the leading edge 11) into the electronic device holder 30 such that, once the electronic device 12 is positioned within the electronic device holder 30, the leading edge 11 of the electronic device 12 is the bottom or lowermost side of the electronic device 12. In the portrait orientation, one of the short edges 8 is the leading edge 11, and, in the landscape orientation, one of the long edges 6 is the leading edge 11. In the vertical orientation, the first side 2 and the second side 4 of the electronic device 12 extend approximately vertically within the electronic device holder 30 (rather than a horizontal orientation in which the electronic device 12 would have a laid flat on one of the first side 2 or the second side 4 and the first side 2 and the second side 4 would have been substantially parallel to a horizontal plane). However, it is understood that the first side 2 and the second side 4 may be slightly angled relative to the vertical plane in the vertical orientation to provide an optimal viewing angle for the user.

As shown in FIG. 5, the electronic device holder 30 allows the electronic device 12 to be charged (via wired charging (as shown in FIG. 5) or wireless charging (as described further herein)) while being held and secured within the electronic device holder 30. To allow the electronic device 12 to be charged via a wire, cable, or cord 13, the cord 13 is plugged into a charging port of the electronic device 12. If the charging port is along the leading edge 11 of the electronic device 12 (i.e., the lower short edge 8 in the portrait orientation), the cord 13 can extend through a lower through-hole, aperture, opening, or gap 32 of the electronic device holder 30. The gap 32 provides direct access at the front of the electronic device holder 30 to a charging port in the leading edge 11 of the electronic device 12 such that the charging port is readily accessible to be connected to the cord 13. This configuration is intended to reduce or prevent occasions where the cord 13 may be being severely bent while the electronic device 12 is secured within the electronic device holder 30. Accordingly, the electronic device 12 may be approximately longitudinally aligned with and centered along one of the gaps 32 when secured within the electronic device holder 30. Alternatively or additionally, the cord 13 may be another type of cord (such as an AUX cable) to provide other functionality.

Figure 6:
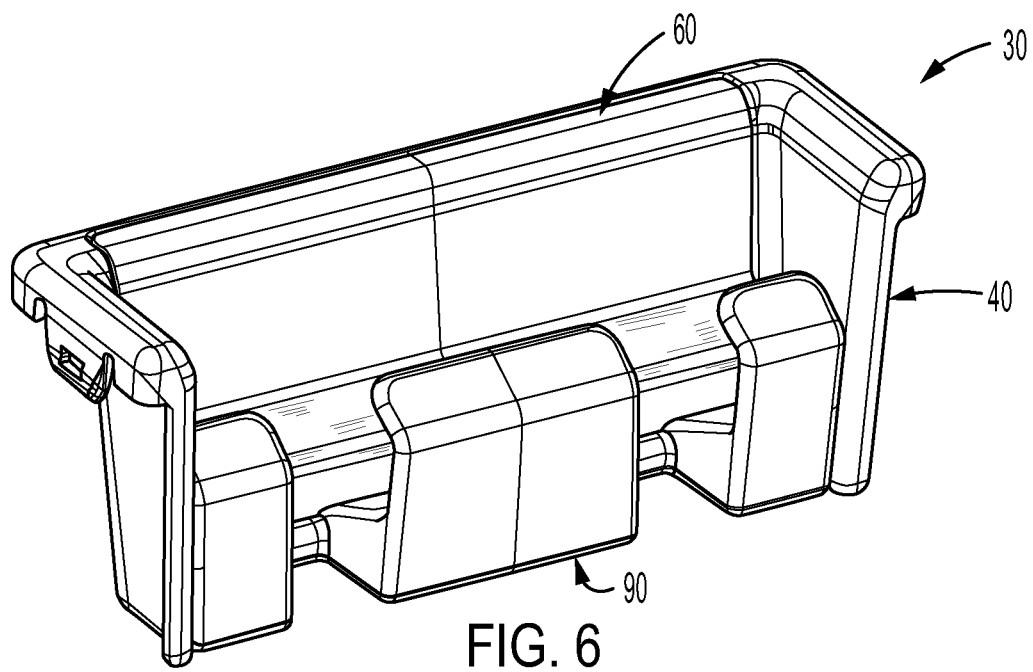
FIG. 6 is a front perspective view of the electronic device holder of FIG. 1 without electronic devices therein.
Figure 7:
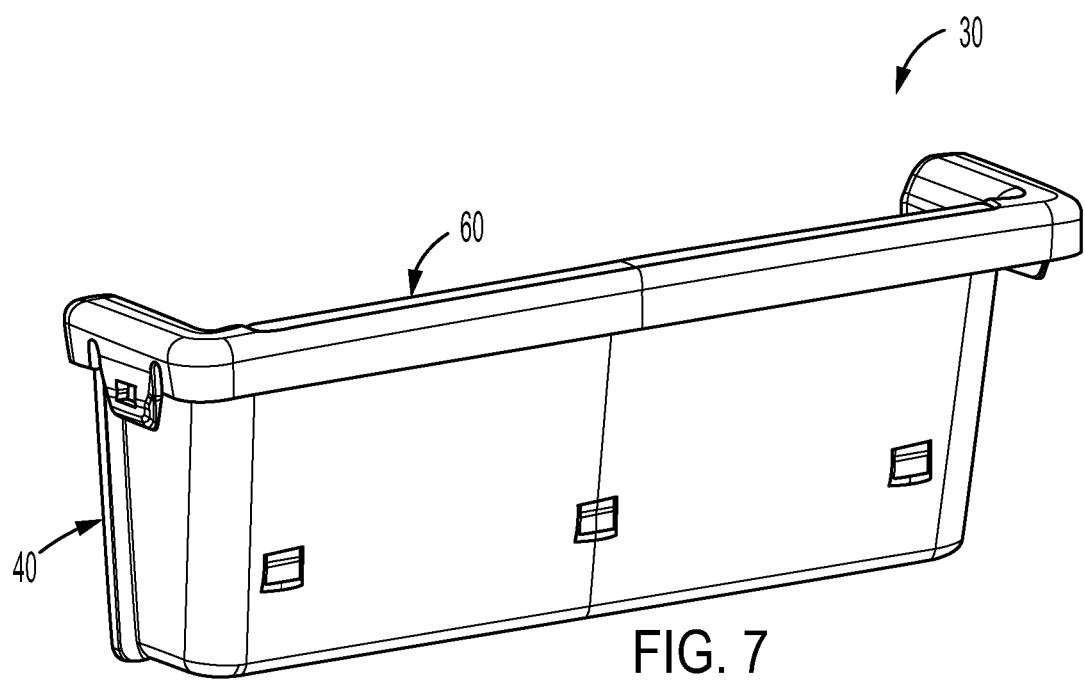
FIG. 7 is a back perspective view of the electronic device holder of FIG. 1.
Figure 8:
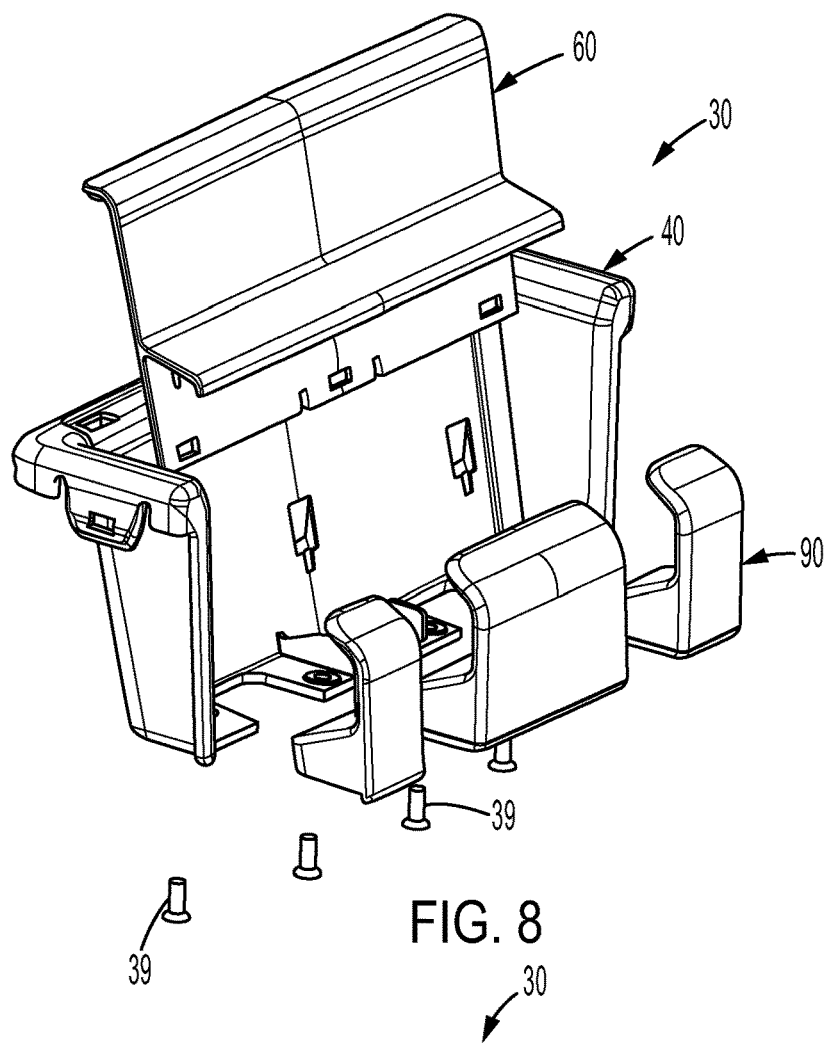
FIG. 8 is a front, top perspective, exploded view of the electronic device holder of FIG. 1.
Figure 9:
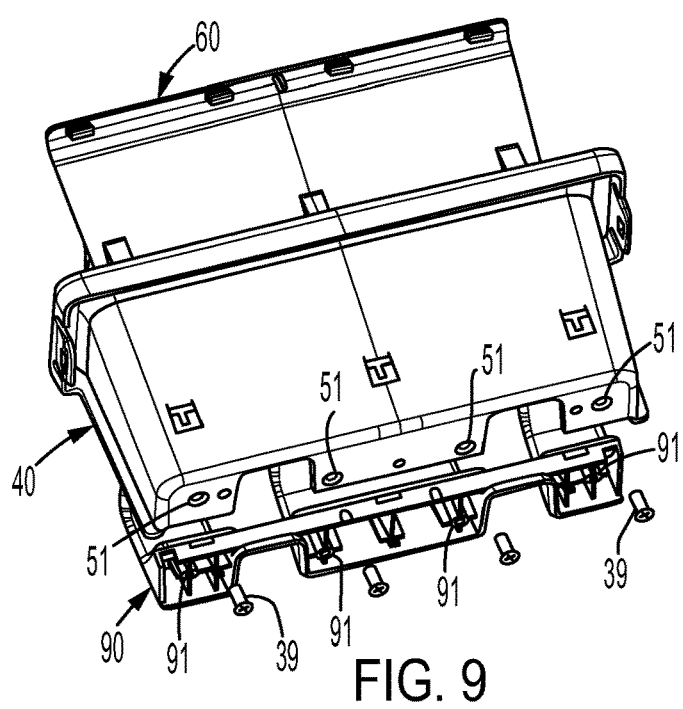
FIG. 9 is a back, bottom perspective, exploded view of the electronic device holder of FIG. 1.

As shown in FIGS. 6-9, the electronic device holder 30 includes a support structure 40, a wall structure 60, and a hook structure 90 that are attachable together to provide an area to secure an electronic device 12. FIG. 6 is a front, perspective view of the electronic device holder 30, with all of its components assembled together, but without any electronic devices 12 contained therein. FIG. 7 is a back, perspective view of the electronic device holder 30, showing how the support structure 40 and the wall structure 60 are attached together (as described further herein). FIG. 8 is a front, top, perspective, exploded view and FIG. 9 is a hack, bottom, perspective, exploded view of the electronic device holder 30, with each of the support structure 40, the wall structure 60, and the hook structure 90 detached from each other. The fasteners 39, that can be used to attach the support structure 40 and the hook structure 90 together (as described further herein), are also shown. As shown, the support structure 40 and the hook structure 90 are configured to receive the fasteners 39 (e.g., screws, such as four M4x12 countersunk screws through respective bottom portions.

Figure 10:
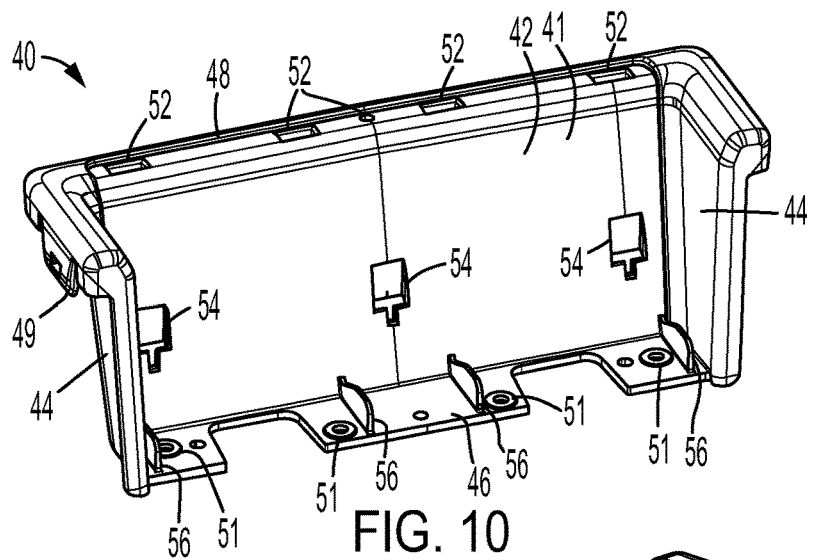
FIG. 10 is a front perspective view of a support structure of the electronic device holder of FIG. 1.
Figure 12:
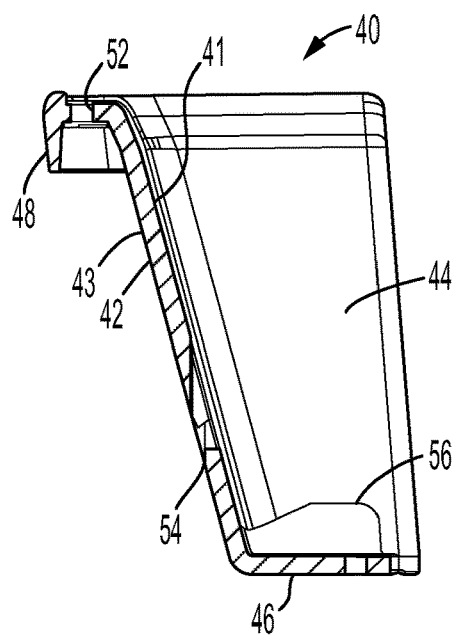
FIG. 12 is a cross-sectional view of the support structure of FIG. 10.

FIGS. 10-12 show various views of the support structure 40 of the electronic device holder 30. The support structure 40 (e.g., a shell, housing, holder, or rigid supporting part) is the base of the electronic device holder 30 and provides a rigid area for the wall structure 60 and the hook structure 90 to attach to. Furthermore, the support structure 40 is configured to attach to a portion of the vehicle 20, such as the center console 22 (as described further herein).

The support structure 40 includes a back wall 42, two side walls 44, a lower wall 46, and an upper lip 48. As shown in FIG. 12, the back wall 42 may extend at a small angle to a longitudinal vertical plane to provide an optimal viewing angle for the user to view the first side 2 of the electronic device 12 (for simplicity, the back wall 42 is considered to extend approximately along the vertical plane). The back wall 42 has a front surface 41 and a back surface 43 that are on opposite sides of the back wall 42. The front surface 41 is positioned along the side of the back wall 42 that the side walls 44 and the lower wall 46 are positioned along.

Figure 21:
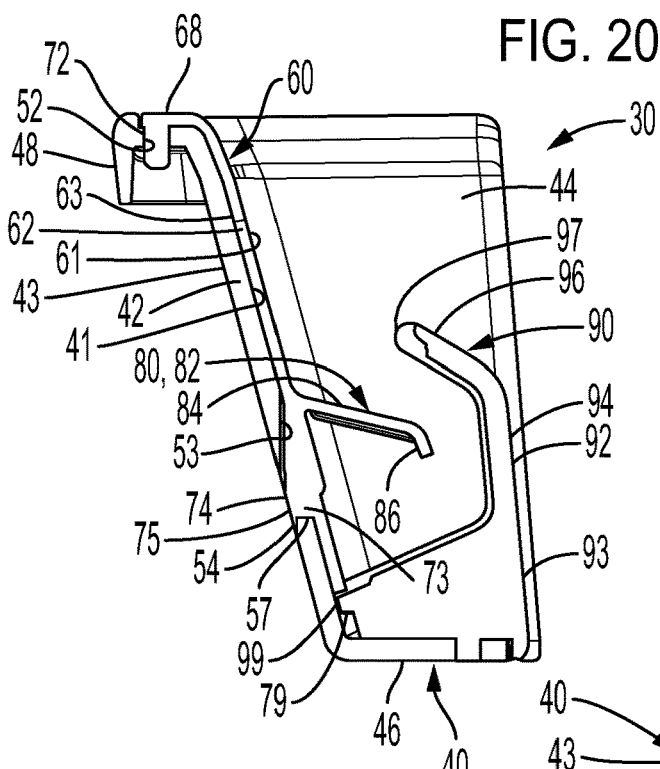
FIG. 21 is a cross-sectional view through Section 21-21 in FIG. 20.

The two side walls 44 extend from opposite longitudinal ends of the back wall 42 and are approximately perpendicular to the back wall 42 (although the back wall 42 may be at a slight angle, as described above). The side walls 44 extend substantially parallel to a lateral vertical plane. The lower wall 46 extends along the bottom edges of and is approximately perpendicular to the back wall 42 and both of the two side walls 44. The lower wall 46 extends substantially parallel to a horizontal plane. The side walls 44 and the lower wall 46 each extend from the front surface 41 of the back wall 42. The lower wall 46 is configured to provide a support area for each of the wall structure 60 and the hook structure 90 to rest on and be supported by (as shown in FIG. 21).

The upper lip 48 extends along the respective top edges of the back wall 42 and both of the two side walls 44. The upper lip 48 extends away from the front surface 41 of the back wall 42 (and therefore toward the back surface 43 of the back wall 42 along the back wall 42). The upper lip 48 is configured to attach to an interior portion of the vehicle 20 (such as a top portion of the side walls of the storage area 26 of the center console 22, as shown in FIG. 3). Accordingly, as shown in FIGS. 10-11, the upper lip 48 includes at least one clip 49 that is configured to removably attach or snap onto to a portion of the vehicle 20, such as the tabs 28 within the storage area 26 (as shown in FIG. 4 and described further herein). According to one embodiment, the upper lip 48 includes two clips 49 positioned along each of the two opposite side walls 44.

To attach to or engage with the wall structure 60 (as described further herein), the support structure 40 includes an upper engagement part 52 and a middle engagement part 54 (that are complementary to and attachable to the upper attachment part 72 and the middle attachment part 74 of the wall structure 60, respectively, as shown and described further herein). The support structure 40 may optionally include multiple upper engagement parts 52 and/or middle engagement parts 54.

As shown in FIG. 10, the upper engagement parts 52 are positioned along the top of the upper lip 48. The upper engagement parts 52 may be slots that are positioned along and spaced apart from each other longitudinally along the longitudinal length of the upper lip 48. Each of the upper engagement parts 52 are configured to receive one of the upper attachment parts 72 of the wall structure 60 (as shown and described further herein).

As shown in FIGS. 10-12, the middle engagement parts 54 are positioned along the back wall 42 and spaced apart from each other longitudinally. The middle engagement parts 54 may be holes (e.g., a through-hole), slots, apertures, or recesses that extend partially or completely through the back wall 42. Each of the middle engagement parts 54 are configured to receive one of the middle attachment parts 74 of the wall structure 60 (as shown and described further herein).

To attach to or engage with the hook structure 90 (as described further herein), the support structure 40 includes a lower engagement part 51 that is complementary to and aligned with a lower attachment part 91 of the hook structure 90, as shown and described further herein), The support structure 40 may optionally include multiple lower engagement parts 51. The lower engagement part 51 may be a through-hole or aperture that is aligned with the lower attachment part 91. Both the lower engagement part 51 and the lower attachment part 91 may be configured to receive a fastener 39 (as shown in FIG. 9) to attach the support structure 40 and the hook structure 90 together. Alternatively, the lower engagement part 51 and the lower attachment part 91 may be configured to hook or snap together without any additional fastener.

To provide support, the support structure 40 includes at least one lower support element 56, as shown in FIGS. 10 and 12. The lower support elements 56 are positioned along the lower wall 46 and spaced apart from each other longitudinally. The lower support elements 56 may be extensions or protrusions that extend vertically from the lower wall 46 and along at least a portion of the front surface 41 of the back wall 42. Each of the lower support elements 56 are configured to be received within a respective lower notch 76 of the wall structure 60 and a lower notch 95 of the hook structure 90 (as shown and described further herein).

Figure 13:
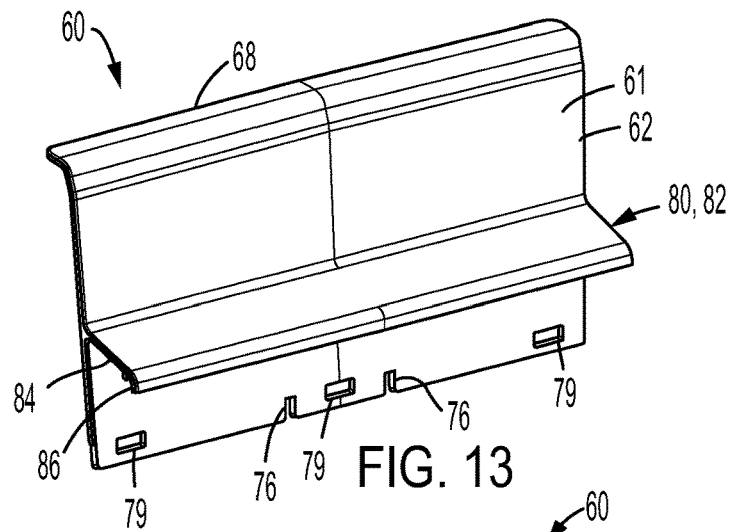
FIG. 13 is a front perspective view of a wall structure of the electronic device holder of FIG. 1.
Figure 14:
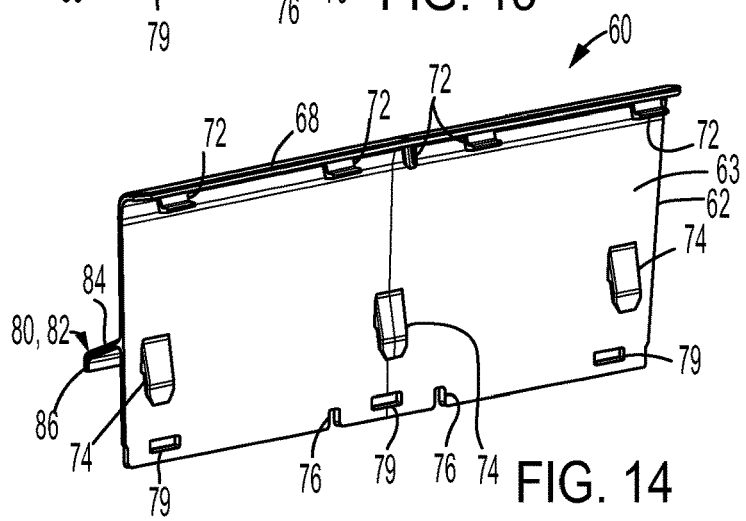
FIG. 14 is a back perspective view of the wall structure of FIG. 13.
Figure 15:
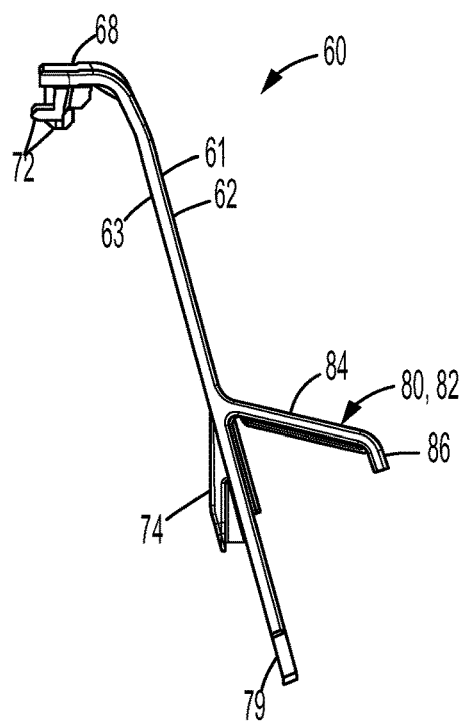
FIG. 15 is a cross-sectional view of the wall structure of FIG. 13.
Figure 16:
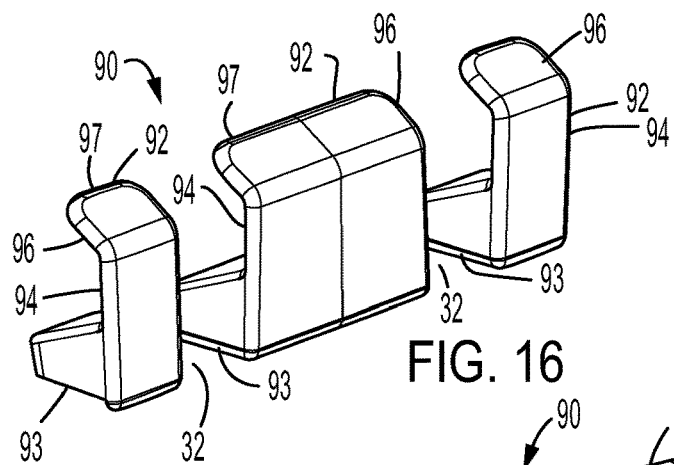
FIG. 16 is a front perspective view of a hook structure of the electronic device holder of FIG. 1.

FIGS. 13-15 show various views of the mat, cover, or wall structure 60 of the electronic device holder 30. The wall structure 60 is configured to attach to the support structure 40 and is configured to directly support, abut, and secure the second side 4 of the electronic device 12.

The wall structure 60 includes a main wall 62, an upper lip 68, and at least one biasing member 80. The main wall 62 has a main or front surface 61 and a back surface 63 that are on opposite sides of the main wall 62. The main wall 62 is positioned relative to the back wall 42 of the support structure 40 such that the front surface 61 faces away from the back wall 42 (and toward the electronic device 12 and the hook structure 90) and the back surface 63 faces toward the back wall 42 of the support structure 40. The main wall 62 (in particular the back surface 63) is configured to extend substantially along the front surface 41 of the back wall 42 of the support structure 40. Therefore, the main wall 62 extends at substantially the same vertical angle as the back wall 42 (as shown and described further herein). The front surface 61 of the main wall 62 is positioned and configured to support and abut the second side 4 of the electronic device 12.

The upper lip 68 ends along the top edge of the main wall 62 and approximately perpendicular to the main wall 62. The upper lip 68 is configured to extend at least partially around and attach the upper lip 48 of the support structure 40. Accordingly, the upper lip 68 extends along or toward the hack surface 63 of the main wall 62.

The biasing member 80 is a compressible and/or flexible feature or component that is configured to at least partially compress toward the back wall 42 of the support structure 40 and the main wall 62 of the wall structure 60 and thereby bias the electronic device 12 away from the back wall 42 and the main wall 62 and toward the hook structure 90 (as shown and described further herein). The biasing member 80 is positioned and configured to extend along and abut the second side 4 of the electronic device 12. By being compressible, the biasing member 80 allows electronic devices 12 of various different sizes to be secured within the electronic device holder 30. The biasing member 80 is positioned along and extends or projects laterally from the front surface 61 of the main wall 62. According to one embodiment as shown in FIGS. 13-15, the biasing member 80 is an arm, extension, protrusion, finger, or projection 82.

As shown in FIG. 13, the projection 82 extends along the longitudinal length of the main wall 62. As shown in FIG. 15, the projection 82 includes a slanted or angled portion 84 (e.g., a board) and a downward portion 86 (e.g., a flat board) that each extend along the entire longitudinal length of the main wall 62. The angled portion 84 extends outward laterally and downwardly directly from the front surface 61 of the main wall 62 at a downward, oblique angle. The downward portion 86 extends from the lower end of the angled portion 84 further downwardly at an oblique angle toward the lower support 98 and the base 93 of the hook structure 90 (as shown in FIG. 21). As shown in FIG. 26 and described further herein, the downward portion 86 is configured to directly support, abut against, engage, and extend vertically along the second side 4 of the electronic device 12.

To attach to or engage with the support structure 40 (as described further herein), in particular along the lateral and longitudinal directions, the wall structure 60 includes an upper attachment part 72 and a middle attachment part 74 (that are complementary to and attachable to the upper engagement part 52 and the middle engagement part 54 of the support structure 40, respectively, as shown and described further herein). The wall structure 60 may optionally include multiple upper attachment parts 72 and middle attachment parts 74 to engage with an upper end (i.e., an area around and/or including the upper lip 48) and the back wall 42, respectively.

As shown in FIG. 14, the upper attachment parts 72 are positioned along a bottom surface of the upper lip 68 and are configured to secure the wall structure 60 to the support structure 40 along their respective longitudinal lengths. The upper attachment parts 72 may be protrusions or extensions that are positioned and spaced apart from each other longitudinally along the longitudinal length of the upper lip 68 and extend vertically downwardly from the bottom surface of the upper lip 68. Each of the upper attachment parts 72 are configured to be received within and snap into one of the upper engagement parts 52 of the support structure 40 (as shown and described further herein).

As shown in FIG. 14, the middle attachment parts 74 are positioned along the back surface 63 of the main wall 62 and spaced apart from each other longitudinally. The middle attachment parts 74 are configured to position and secure the main wall 62 of the wall structure 60 relative to the back wall 42 of the support structure 40, both longitudinally and laterally. The middle attachment parts 74 may be protrusions, sliding tabs, or extensions that extend laterally from the back surface 63 of the main wall 62. Each of the middle attachment parts 74 are configured to be received within one of the middle engagement parts 54 of the support structure 40 (as shown and described further herein).

As shown in FIGS. 13-14, the wall structure 60 includes at least one lower slot or notch 76 that is positioned along a lower portion of the main wall 62. The lower notch 76 extends vertically along a portion of the height of the main wall 62. The wall structure 60 may include multiple lower notches 76 that are spaced apart from each other longitudinally to align with each of the lower support elements 56. The lower notches 76 are complementary to and configured to receive at least a portion of a respective one of the lower support elements 56 of the support structure 40 (as described further herein).

As further shown in FIGS. 13-14, the wall structure 60 also includes at least one lower recess, through-hole, or aperture 79 (i.e., a lower attachment part) that is positioned along a lower portion of the main wall 62. The wall structure 60 may include multiple apertures 79 that are spaced apart from each other longitudinally to align with each of the protrusions 99 of the hook structure 90. The apertures 79 are complementary to and configured to receive, engage with, and attach to a respective one of the protrusions 99 of the hook structure 90 (as described further herein).

However, according to another embodiment, the wall structure 60 may include the upper engagement parts 52, the middle engagement parts 54, and/or the protrusions 99, and the support structure 40 may include the upper attachment parts 72 and/or the middle attachment parts 74 and/or the hook structure 90 may include the aperture 79.

FIGS. 16-19 show various views of the container or hook structure 90 of the electronic device holder 30. The hook structure 90 is configured to directly support, abut, and secure the first side 2 of the electronic device 12 (i.e., the opposite side of the electronic device 12 that the wall structure 60 directly supports).

Figure 17:
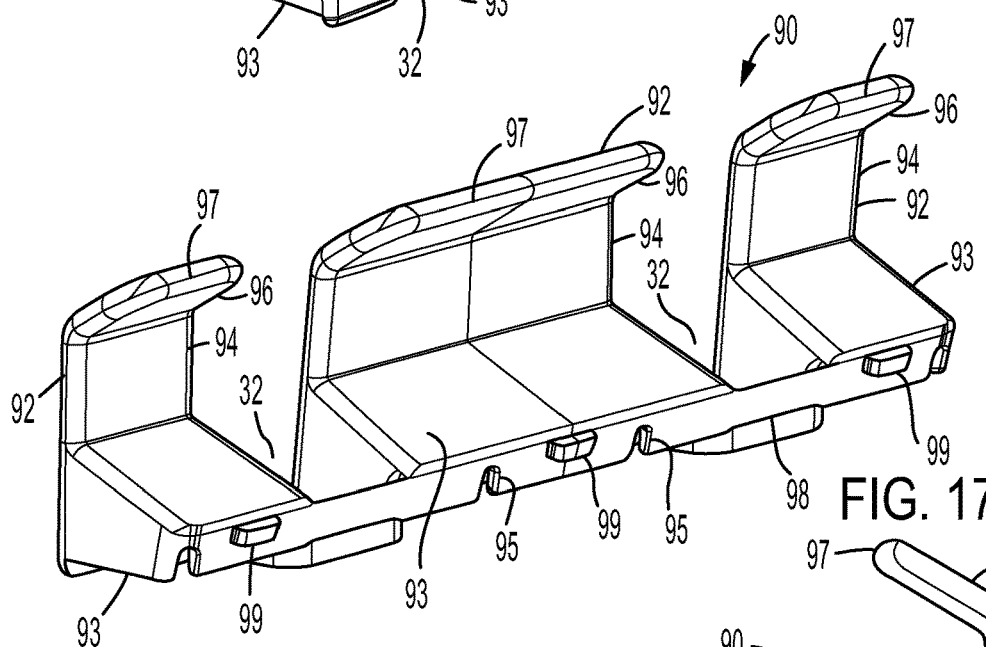
FIG. 17 is a back perspective view of the wall structure of FIG. 16.

As shown in FIG. 17, the hook structure 90 includes at least one hook 92 and a horizontal or lower support 98. Preferably, the hook structure 90 includes multiple hooks 92 that are each longitudinally spaced apart from each other along longitudinal lengths of the lower support 98 and the electronic device holder 30 by a longitudinal gap 32 (e.g., two gaps 32 for three hooks 92). Each of the hooks 92 are configured to support and extend along at least a portion of the longitudinal length of the electronic device 12. As shown and described further herein, the hooks 92 are positioned and configured to directly support and abut the first side 2 of the electronic device 12.

Figure 18:
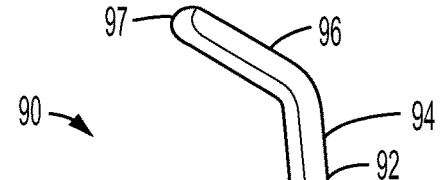
FIG. 18 is a cross-sectional view of the wall structure of FIG. 16.

As shown in FIGS. 17-18, the hooks 92 each include a base 93, a vertical wall 94, and an angled wall 96. The base 93 provides an area to connect and attach to the lower support 98 and may extend laterally between the vertical wall 94 and the lower support 98 to laterally space the rest of the hook 92 apart from the wall structure 60.

The vertical wall 94 extends vertically between top of the base 93 and the bottom of the angled wall 96. The angled wall 96 extends upwardly and laterally inwardly at an oblique angle from the top of the vertical wall 94 toward the main wall 62 of the wall structure 60 (as shown in FIG. 21). The angled wall 96 and the base 93 extend laterally from the same side of the vertical wall 94. Accordingly, the angled wall 96, the base 93, and the lower support 98 are all positioned along the same side of the vertical wall 94. The angled wall 96 includes a top end portion 97 positioned at the top of the angled wall 96. The end portion 97 is positioned and configured to directly contact, support, and abut the first side 2 of the electronic device 12 (as shown in FIG. 26 and described further herein).

Figure 19:
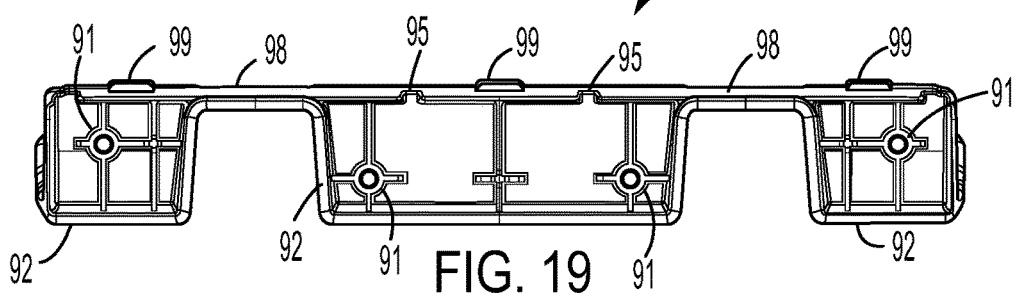
FIG. 19 is a bottom view of the wall structure of FIG. 16.

As shown in FIGS. 17-19, the lower support 98 extends longitudinally along at least a portion of each of the hooks 92 and longitudinally aligns and connects each of the hooks 92. The lower support 98 is attached to the respective bases 93 of each of the hooks 92 such that the lower support 98 is positioned lower than the vertical wall 94 and the angled wall 96. The lower support 98 spaces each of the hooks 92 apart from each other longitudinally by a gap 32, which provides an area for a charging cord 13 to be attached to or plugged into the electronic device 12 while the electronic device 12 is secured within the electronic device holder 30 (as shown and described further herein in regard to FIG. 5). The lower support 98 is spaced laterally inwardly (i.e., closer to the wall structure 60, as shown further herein) than the gap 32. Accordingly, there is a gap 32 between each of the hooks 92, and the hooks 92 are positioned on both longitudinal ends and the center of the wall structure 60. If the hook structure 90 includes three hooks 92, there are two side hooks 92 and a middle hook 92.

As shown in FIG. 17, the hook structure 90 includes at least one lower slot or notch 95 that is positioned along a lower portion of the hook structure 90 (i.e., along the lower support 98 and/or the base 93). The lower notch 95 extends vertically along a portion of the height of the hook structure 90. The hook structure 90 may include multiple lower notches 95 that are spaced apart from each other longitudinally to align with each of the lower support elements 56. The lower notches 95 are complementary to and configured to receive at least a portion of a respective one of the lower support elements 56 of the support structure 40 (as described further herein).

As shown in FIGS. 17-19, the hook structure 90 also includes at least one lower engagement part (i.e., an extension or protrusion 99) that is positioned along a lower portion of the hook structure 90 (i.e., along the lower support 98 and/or the base 93) and extends laterally from the hook structure 90. The hook structure 90 may include multiple protrusions 99 that are spaced apart from each other longitudinally to align with each of the apertures 79 of the wall structure 60. The protrusions 99 are each complementary to and configured to be received within a respective one of the apertures 79 of the wall structure 60 (as described further herein). The protrusions 99 and the apertures 79 allow the hook structure 90 and the wall structure 60 to be securely attached to each other, in particular while the electronic device 12 is gripping portions of the electronic device holder 30 while being removed from the electronic device holder 30.

As shown in FIG. 19, to attach to or engage with the support structure 40 (as described further herein), the hook structure 90 includes a lower attachment part 91 that is complementary to and aligned with the lower engagement part 51 of the support structure 40, as shown and described further herein). The hook structure 90 may optionally include multiple lower attachment parts 91. The lower attachment part 91 allows the hook structure 90 to engage with a lower end (i.e., the area around and/or including the lower wall 46) of the support structure 40.

The lower attachment part 91 may be a through-hole or aperture that is aligned with the lower engagement part 51.

Both the lower attachment part 91 and the lower engagement part 51 may be configured to receive a fastener 39 (as shown in FIG. 9) to attach the hook structure 90 and the support structure 40 together. Alternatively, the lower attachment part 91 and the lower engagement part 51 may be configured to hook or snap together without any additional fastener.

Figure 20:
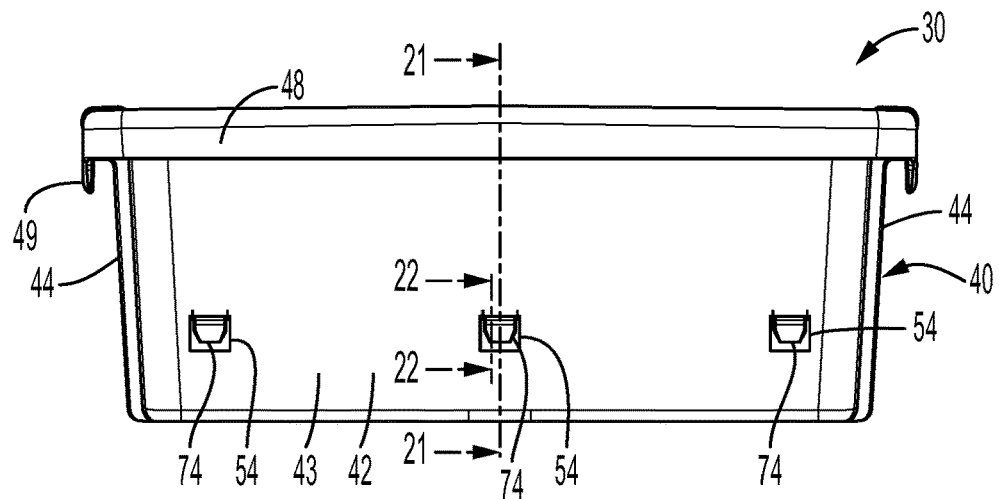
FIG. 20 is a back view of the electronic device holder of FIG. 1.

FIGS. 20-21 show how the support structure 40, the wall structure 60, and the hook structure 90 of the electronic device holder 30 are attached, assembled, and fit together. FIG. 20 is a back view of the electronic device holder 30, with all of its components assembled together. When assembled, both the wall structure 60 and the hook structure 90 are positioned longitudinally in between the two side walls 44 of the support structure 40.

As shown in FIG. 21, the hook structure 90 is positioned on top of and above the lower wall 46 of the support structure 40. Accordingly, the fasteners 39 (as shown in FIG. 9) can extend through both the lower engagement part 51 and the lower attachment part 91 to attach the support structure 40 and the hook structure 90 together. Furthermore, as shown in FIG. 21, the hook structure 90 is positioned laterally in front of the wall structure 60 such that the lower support 98 and/or the base 93 engages with the front surface 61 of the main wall 62 of the wall structure 60. Accordingly, each of the protrusions 99 of the hook structure 90 are positioned within and inserted into a respective one of the apertures 79 of the wall structure 60 (or vice versa, depending on their relative configurations), which secures the hook structure 90 and the wall structure 60 together.

The wall structure 60 is also positioned above the lower wall 46 of the support structure 40. Accordingly, when assembled, the lower notch 76 of the wall structure 60 and the lower notch 95 of the hook structure 90 each receive a vertical portion of a respective one of the lower support elements 56 of the support structure 40 (shown in FIG. 10) such that the wall structure 60 and the hook structure 90 extend along opposite sides of each of the lower support elements 56. Accordingly, the bottom edge of the wall structure 60 and the bottom surface of the base 93 of the hook structure 90 abut or extend along the top surface of the lower wall 46 of the support structure 40.

As further shown in FIG. 21, the wall structure 60 is placed on top and in front of the back wall 42 of the support structure 40 such that the back surface 63 of the main wall 62 of the wall structure 60 is flush against and parallel to the front surface 41 of the back wall 42 of the support structure 40. Accordingly, the biasing member 80 extends laterally away from the back wall 42 of the support structure 40.

Due to the relative positioning of the support structure 40, the wall structure 60, and the hook structure 90, the main wall 62 and the biasing member 80 of the wall structure 60 are positioned in between the back wall 42 of the support structure 40 and the hook structure 90. The hook structure 90 and the wall structure 60 are sized and positioned such that the biasing member 80 is positioned vertically in between the base 93 and the angled wall 96 and laterally in between the vertical wall 94 and the back wall 42 (and the main wall 62). However, there are gaps or spaced in between the biasing member 80 and the hook structure 90 to provide an area to position and secure the electronic device 12, as shown and described further herein.

Furthermore, the wall structure 60 and the support structure 40 are attached and secured (e.g., snapped) together through the various attachment and engagement parts. For example, the upper attachment part 72 of the wall structure 60 is inserted into the upper engagement part 52 of the support structure 40, and the middle attachment part 74 is inserted into the middle engagement part 54 (or vice versa, depending on their relative configurations).

Figure 22:
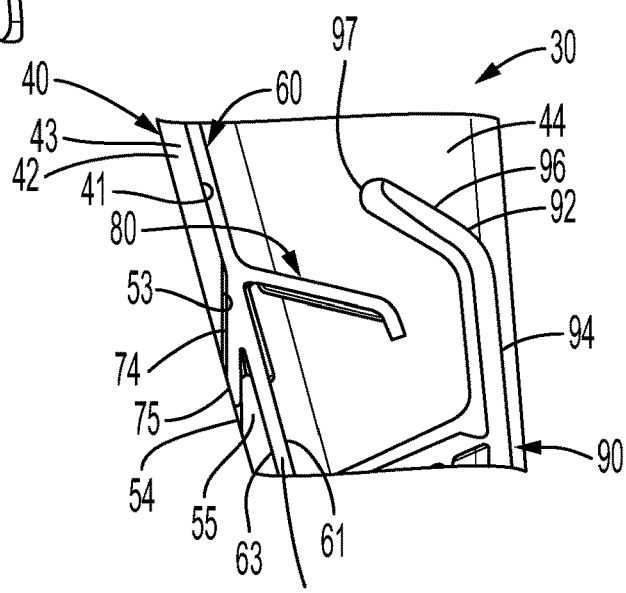
FIG. 22 is a cross-sectional view through Section 22-22 in FIG. 20.
Figure 23:
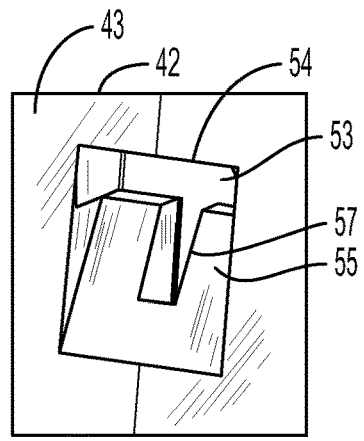
FIG. 23 is a back, perspective view of a middle engagement part of the support structure of the electronic device holder of FIG. 1.
Figure 24:
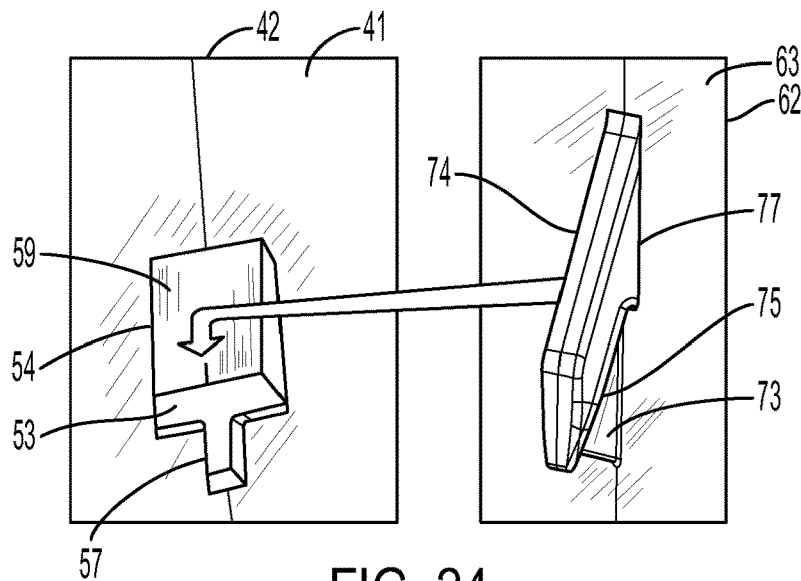
FIG. 24 is a perspective view of a middle attachment part of the wall structure being inserted into the middle engagement part of the support structure of the electronic device holder of FIG. 1.

FIGS. 21-25 show one embodiment of how the support structure 40 and the wall structure 60 are attached to and firmly secured to each other, in particular through the middle engagement part 54 and the middle attachment part 74. As shown in FIGS. 23-24, the middle engagement part 54 of the support structure 40 includes an aperture 53, a recessed portion 59 (shown in FIG. 24), and an angled inner wall 55 that defines a gap or slot 57. The aperture 53 extends completely through the back wall 42 and extends vertically from the bottom of angled inner wall 55 to the top of the recessed portion 59. The recessed portion 59 is positioned within the aperture 53 and is laterally thinner than and angled and recessed relative to the front surface 41 of the back wall 42 (as shown in FIG. 24).

The angled inner wall 55 is positioned within the aperture 53 and is laterally thinner than and angled and recessed relative to the back surface 43 of the back wall 42 (as shown in FIG. 23). The angled inner wall 55 defines a vertical middle slot 57 that extends along at least a vertical portion of the angled inner wall 55. The longitudinal width of the slot 57 is smaller than that of the angled inner wall 55 and is approximately equal to or greater than the longitudinal width of the lateral lip 73 of the middle attachment part 74 such that the lateral lip 73 can fit into the slot 57 (as described further herein).

The recessed portion 59 is an upper portion of the aperture 53, and the angled inner wall 55 is a lower portion of the aperture 53. Accordingly, the recessed portion 59 and the angled inner wall 55 may be vertically spaced apart from each other by a middle gap.

As shown in FIG. 24, the middle attachment part 74 of the wall structure 60 is a sliding tab that includes an extension 75 and a lateral lip 73 that are substantially perpendicular to and extend laterally from the back surface 63 of the main wall 62. The extension 75 includes a base 77 that is attached to the back surface 63 of the main wall 62. The extension 75 extends downwardly at an oblique angle from the base 77 along the back surface 63 of the main wall 62 and may be tapered. The lateral lip 73 extends laterally between a back surface of the extension 75 (i.e., an area beneath the base 77) and the back surface 63 of the main wall 62. The lateral lip 73 is centered longitudinally along the extension 75. The longitudinal thickness of the lateral lip 73 is less than that of the extension 75.

Figure 25:
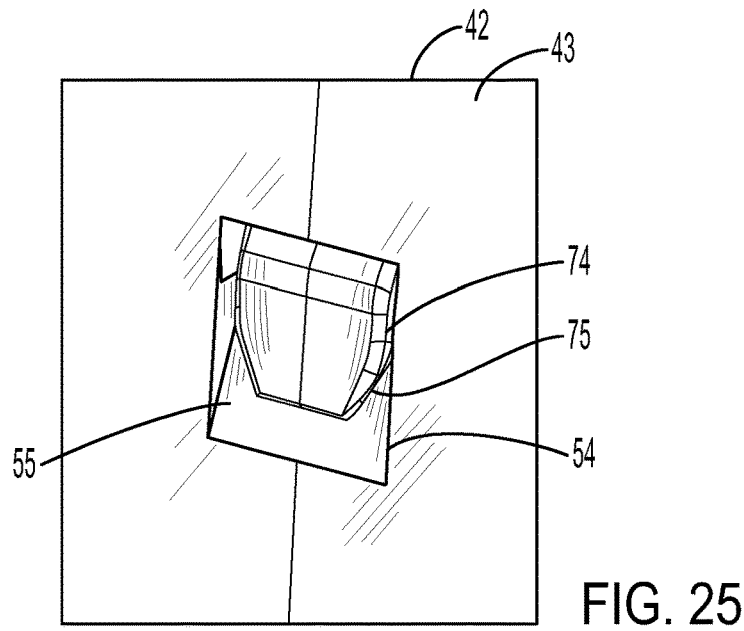
FIG. 25 is a hack, perspective view of the middle attachment part of the wall structure attached to the middle engagement part of the support structure of the electronic device holder of FIG. 1.

As shown in FIGS. 24-25, to attach the middle engagement part 54 and the middle attachment part 74 (to thus attach the wall structure 60 onto the support structure 40), the middle attachment part 74 of the wall structure 60 aligned with and received within one of the middle engagement parts 54. In particular, the extension 75 is moved or inserted into the upper portion of the aperture 53 along the recessed portion 59, as the wall structure 60 is moved laterally toward and vertically downward relative to the support structure 40. As the extension 75 is slide downwardly into the aperture 53, the lateral lip 73 is moved into the slot 57 until the back surface 63 of the main wall 62 abuts the front surface 41 of the back wall 42. This positions an end portion of the extension 75 along the back surface 43 of the back wall 42 (as shown in FIG. 25). This attachment secures the support structure 40 and the wall structure 60 together both longitudinally and laterally.

As shown in FIGS. 21-22, the middle engagement part 54 and the middle attachment part 74 are sized such that, along any vertical portion, the total lateral thickness of both the middle engagement part 54 and the middle attachment part 74 is approximately equal to or less than the lateral thickness of the back wall 42. Furthermore, to allow the middle attachment part 74 to completely fit within the middle engagement part 54, the distance between the top of the inner wall 55 and the top of the aperture 53 is approximately equal to or slightly greater than the height of base 77 of the extension 75. Accordingly, when the middle attachment part 74 is attached to the middle engagement part 54, the end surface of the extension 75 is flush with the back surface 43 of the back wall 42 (or recessed relative to the back surface 43, within the aperture 53). Therefore, the middle attachment part 74 does not project beyond the back surface 43 of the back wall 42 of the support structure 40 and still allows the back surface 63 of the main wall 62 to extend flush against the front surface 41 of the back wall 42.

As shown in FIG. 26, when the electronic device 12 is positioned and secured within the electronic device holder 30, the electronic device holder 30 secures the electronic device 12 along at least three supporting points or areas of contact: an upper area or point of contact 34, a middle area or point of contact 36, and a lower area or point of contact 38. The middle point of contact 36 is positioned vertically in between the upper point of contact 34 and the lower point of contact 38 (i.e., below and above, respectively) along the height of the electronic device 12 (and the height of the electronic device holder 30). Accordingly, the middle point of contact 36 biases the top of the electronic device 12 toward the top of the main wall 62 (i.e., the upper point of contact 34) to prevent torque from being exerted onto the electronic device 12 and to prevent rattling.

The positioning and configuration of each of the points of contact ensures that the electronic device 12 is securely and tightly retained in position within the electronic device holder 30 and prevents the electronic device 12 from falling out of the electronic device holder 30, regardless of any sudden vehicle acceleration or deceleration or rough road conditions. In particular, the upper point of contact 34 and the lower point of contact 38 are positioned along and directly contact or abut the second side 4 of the electronic device 12, while the middle point of contact 36 is positioned along and directly contacts or abuts the first side 2 of the electronic device 12. Accordingly, the upper point of contact 34 and the lower point of contact 38 exert a supporting force onto the electronic device 12 that directly opposes the supporting force of the middle point of contact 36. Furthermore, each of the upper point of contact 34, the middle point of contact 36, and the lower point of contact 38 extends longitudinally along the width of the first side 2 or the second side 4 of the electronic device 12.

The upper point of contact 34 is at the top of the front surface 61 of the main wall 62 of the wall structure 60, before or at the transition into the upper lip 68. Accordingly, an upper portion of the main wall 62 is configured to abut an upper portion of the electronic device 12 (along the second side 4 of the electronic device 12). The middle point of contact 36 is at the end portion 97 of the angled wall 96 of the hook 92 of the hook structure 90. Accordingly, the end portion 97 is configured to abut a middle portion of the electronic device 12 (along the first side 2 of the electronic device 12). The lower point of contact 38 is along the downward portion 86 of the projection 82 (that is the biasing member 80). Accordingly, the biasing member 80 is configured to abut a lower portion of the electronic device 12 (along the second side 4 of the electronic device 12). The downward portion 86 may extend along a portion of the height of the electronic device 12 along the second side 4, which increases the amount of support given to the electronic device 12.

Additionally, the electronic device holder 30 may have an additional points or areas of contact, such as along the bottom of the electronic device 12. For example, the bottom of the electronic device 12 may contact the inner surface of the vertical wall 94 and/or the upper surface of the base 93 of the hook 92.

Furthermore, each of the points of contact 34, 36, 38 are constructed out of a relatively soft gripping material, such as rubber (e.g., thermoplastic vulcanizate (TPV) rubber) to prevent the electronic device 12 from being scratched during insertion into or removal from the electronic device holder 30, as well as to securely hold the electronic device 12 and prevent any squeaking or rattling. Accordingly, the front surface 61 of the main wall 62, the front surface of the biasing member 80 (or the entire wall structure 60), and the inner surface of the hook 92 (including the end portion 97) may be constructed out of rubber. According to one embodiment, the hook 92 may include an inward-facing coating or layer (that directly abuts the electronic device 12, faces the wall structure 60, and is constructed out of a relatively soft, gripping material, such as rubber) and a rigid outer layer (that provides support and structure to the hook 92, faces away from the wall structure 60, and may be constructed out of a relatively rigid support material, such as plastic). The entire biasing member 80 may be constructed out of a flexible material, such as rubber, to be flexible and compressible.

The configuration of the electronic device holder 30 also positions the electronic device 12 at a small angle (relative to a vertical plane) with the majority of the first side 2 of the electronic device to be accessible and unobscured to allow the user to easily use, access, and/or view the first side 2 of the electronic device 12 while being secured within the electronic device holder 30. For example, as shown in FIG. 26, the back wall 42 is positioned at an angle relative to a vertical plane, which thereby orients the main wall 62 and therefore the electronic device 12 at an angle. Furthermore, the middle point of contact 36 and the lower point of contact 38 are laterally in front of the upper point of contact 34, which positions the lower portion of the electronic device 12 laterally in front of the upper portion of the electronic device 12, thereby angling the electronic device 12 such that the first side 2 is angled upwards. Additionally, the middle point of contact 36 (which is the only point of contact along the first side 2 of the electronic device 12) is positioned along a lower portion of the first side 2 of the electronic device 12 (i.e., the hook 92 extends along only the lower portion of the first side 2), which allows the majority of the first side 2 to be visible and unobscured.

The biasing member 80 may be a variety of different types of variable crush or compressible features that secure and abut against a lower portion of the second side 4 of the electronic device 12. The biasing members 80 are configured to compress toward the front surface 61 of the main wall 62 according to the specific size of the electronic device 12 (which allows various sizes of electronic devices 12 (in particular their thickness between the first side 2 and the second side 4, with or without their outer cases) to be secured within the electronic device holder 30. Due to the biasing member 80 being compressed, the biasing member 80 presses the electronic device 12 toward the inner surface (and the end portion 97) of each of the hooks 92 to provide a tight grip on the electronic device 12 and prevent the electronic device 12 from falling out of the electronic device holder 30.

The main wall 62 and the biasing member 80 (or multiple biasing members 80) may be integrally formed together as a single, unitary component that cannot be separated without destruction. Accordingly, the wall structure 60 may be constructed as a single-piece.

According to one embodiment as shown in FIG. 27 and described further herein, the biasing member 80 is a projection 82 that includes the angled portion 84 and the downward portion 86. FIG. 27 shows how the projection 82 compresses toward the front surface 61 of the main wall 62 (in particular due to the angled portion 84 flexing toward the main wall 62) as the electronic device 12 is inserted in between the projection 82 and the hook 92.

According to another embodiment as shown in FIGS. 28-31, the biasing member 80 is at least one compressible bump or bubble 182 that is formed by the main wall 62 of the wall structure 60 and the back wall 42 of the support structure 40. The bubble 182 extends along at least a portion of the longitudinal length of the main wall 62 of the wall structure 60. To secure the electronic device 12, the bubble 182 directly abuts and presses against the second side 4 of the electronic device 12.

The bubble 182 may include all of the various features and components of the projection 82, unless otherwise noted in the description herein. For example, the bubble 182 may also be constructed out of rubber.

Figure 28:
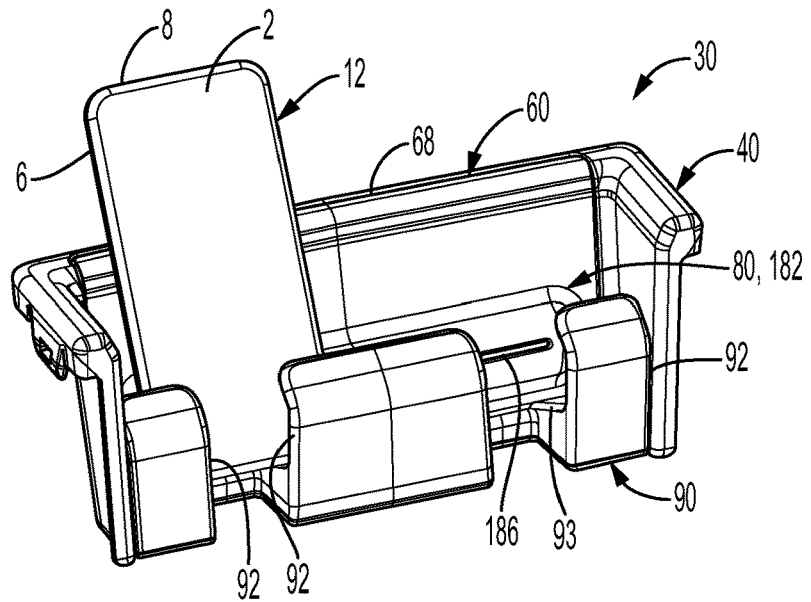
FIG. 28 is a front, perspective view of an electronic device holder according to another embodiment.
Figure 29:
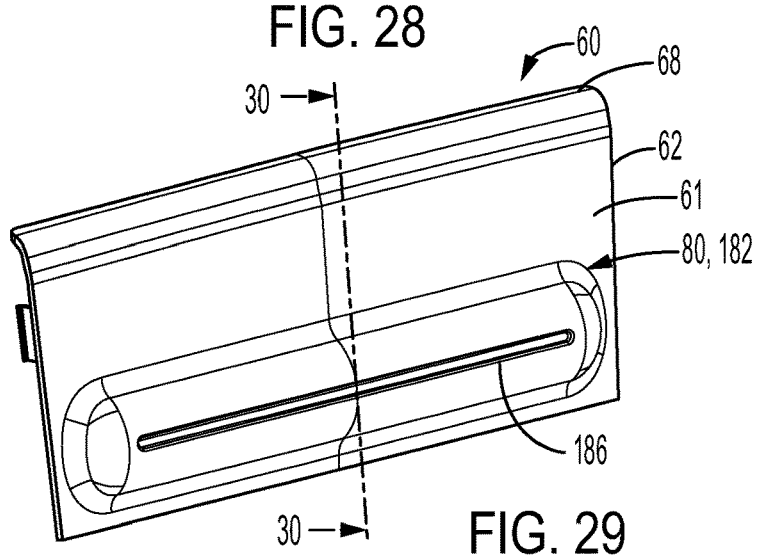
FIG. 29 is a front, perspective view of a wall structure of the electronic device holder of FIG. 28.
Figure 30:
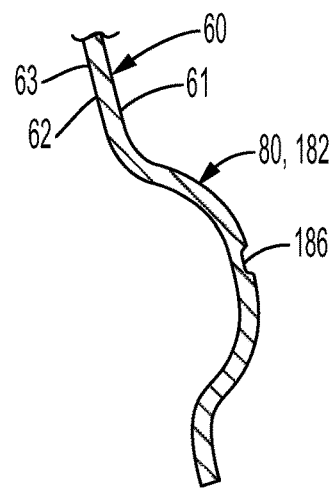
FIG. 30 is a cross-sectional view through Section 30-30 in FIG. 29.

As shown in FIG. 29, the bubble 182 is positioned along a lower portion of the main wall 62, and the lowermost portion of the bubble 182 is vertically spaced apart from the bottom edge of the main wall 62 (and therefore vertically spaced apart from the base 93 of the hook structure 90, as shown in FIG. 28). As shown in FIG. 30, the bubble 182 may create a hollow area. Accordingly, when the wall structure 60 is assembled onto the support structure 40 (as shown in other drawings), the bubble 182 forms a hollow area that is filled with air between the back surface 63 of the main wall 62 and the front surface 41 of the back wall 42.

To facilitate compressing when the electronic device 12 is positioned within the electronic device holder 30, the bubble 182 may include a thinned region 186, as shown in FIGS. 29-30. The thinned region 186 may be approximately centered vertically along the bubble 182 (e.g., along the outermost area of the bubble 182 that is positioned furthest away from the main wall 62) and extend along the entire longitudinal length of the bubble 182.

Figure 31:
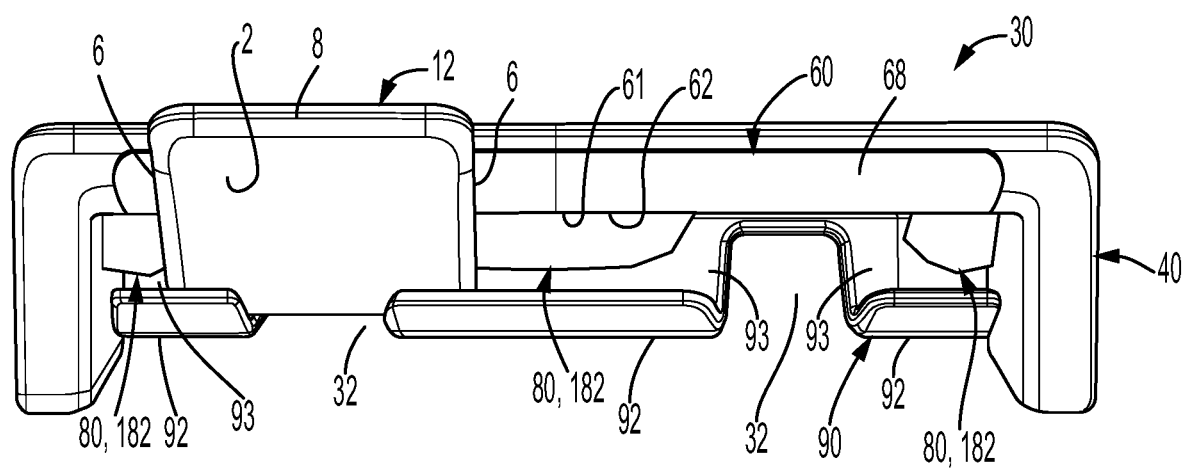
FIG. 31 is a top view of an electronic device holder according to another embodiment.

The bubble 182 may either extend along the majority of the longitudinal length of the main wall 62 (as shown in FIG. 29) or along smaller portions of the longitudinal length of the main wall 62 (as shown in FIG. 31). More specifically, according to one embodiment as shown in FIG. 29, the wall structure 60 includes only one bubble 182 that extends along the majority of the length of the main wall 62 (i.e., continuously along and between at least a portion of each of the hooks 92).

According to another embodiment as shown in FIG. 31, the wall structure 60 includes multiple biasing members 80 (i.e., multiple bubbles 182) that are spaced apart from each other along the longitudinal length of the main wall 62 of the wall structure 60 by longitudinal gaps that are longitudinally aligned with gaps 32 between the hooks 92 of the hook structure 90. In particular, each of the bubbles 182 are longitudinally aligned with each of the hooks 92 such that, if there are three hooks 92, the wall structure 60 includes three bubbles 182. Furthermore, the bubbles 182 may each be less long (longitudinally) than the respective hook 92 the bubble 182 is aligned with. Accordingly, when the electronic device 12 is oriented in the portrait orientation and aligned with the gap 32, the electronic device 12 is positioned at least partially between the gap between each of the bubbles 182 such that the bubbles 182 only abut the side areas of the second side 4 of the electronic device 12 (and/or the long edges 6 of the electronic device 12) and do not abut the middle portion of the second side 4.

Figure 32:
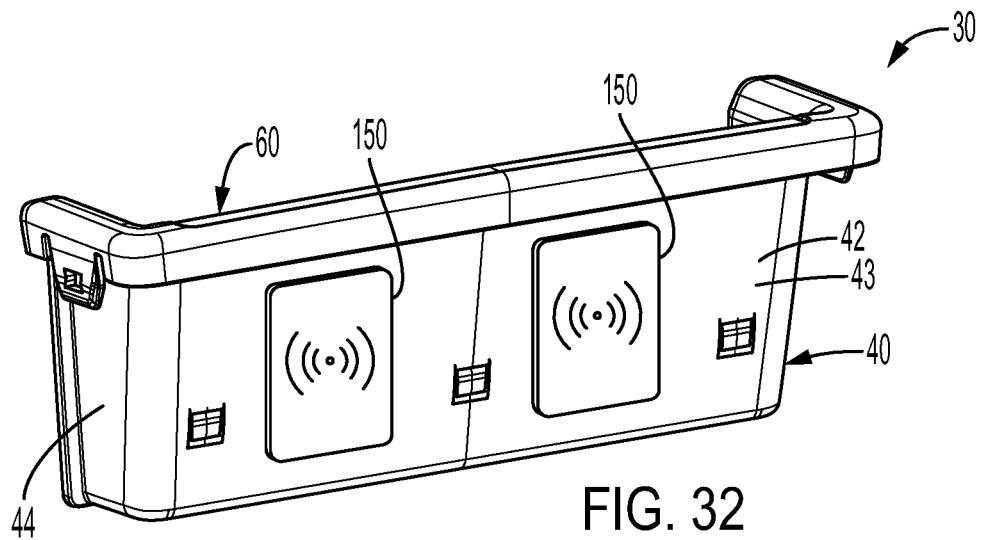
FIG. 32 is a back, perspective view of an electronic device holder according to another embodiment in which wireless device charging mechanisms are used.
Figure 33:
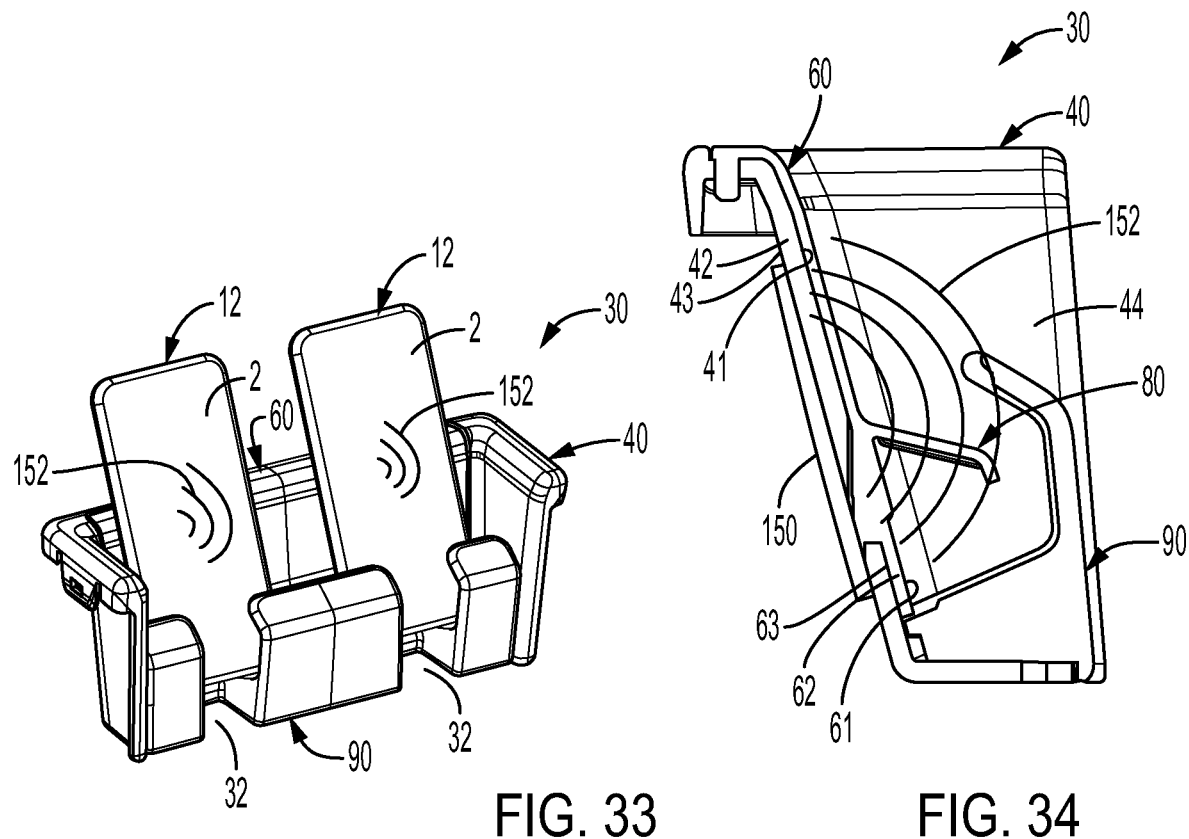
FIG. 33 is a front, perspective view of the electronic device holder of FIG. 32 holding two electronic devices.
Figure 34:
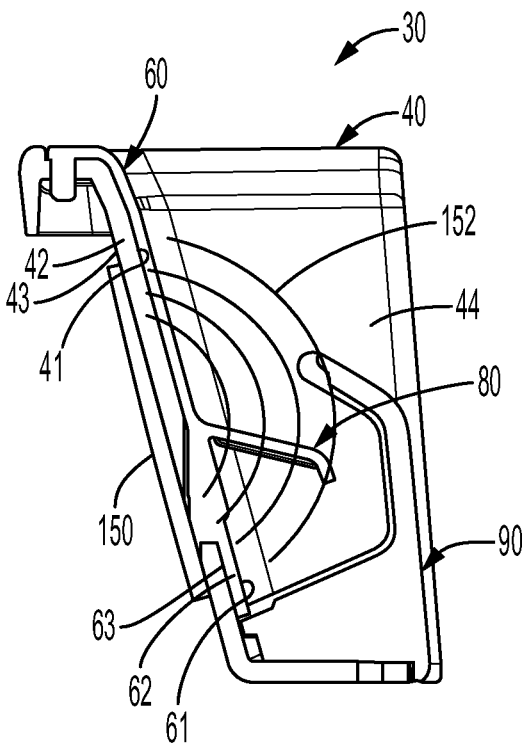
FIG. 34 is a cross-sectional view of the electronic device holder of FIG. 32.

According to one embodiment as shown in FIGS. 32-34, the electronic device holder 30 includes a wireless charger structure 150 that is configured to allow the electronic device 12 to be wirelessly charged while the electronic device 12 is being secured within or coupled to a portion of the electronic device holder 30. The wireless charger structure 150 may include the wireless charger (e.g., charging coils) and/or the wireless charger holder (where the wireless charger holder is configured to secure and hold the wireless charger). The wireless charger structure 150 eliminates the need for the cords 13 for wired charging.

As shown in FIG. 32, the electronic device holder 30 may include one or more wireless chargers 150 for charging electronic devices retained within the electronic device holder, as depicted by the charging waves 152 in FIG. 33. According to the embodiment shown in FIGS. 32-34, the electronic device holder 30 includes two wireless charger structures 150 that are each laterally aligned with one of the gaps 32 (as shown in FIG. 33) to be centered with the electronic device 12.

As shown in FIG. 34, the wireless charger 150 may be positioned on the back surface 43 of the back wall 42 of the support structure 40. The wireless charger structure 150 is configured to emit charging waves 152 that are directed toward the main wall 62 of the wall structure 60 and the hooks 92 of the hook structure 90 (and therefore to the electronic device 12). It should be noted that the wireless chargers shown in FIGS. 32-34 may be used with any of the embodiments shown and described herein, and that such chargers may be positioned at various other locations (e.g., on the inner surface of the device holder, etc.) according to other exemplary embodiments.

The electronic device holder 30 may be constructed out of a variety of different materials, according to the desired configuration. For example, the support structure 40 may be constructed out of polycarbonate (PC) and acrylonitrile butadiene styrene (ABS) and optionally painted. The wall structure 60 may be constructed out of TPV rubber. The hook structure 90 may be constructed out of polypropylene carbonate (PPC) and TPV rubber by dual injection.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An electronic device holder configured to hold at least one electronic device that has a first side and a second side that are opposite each other, the electronic device holder comprising:
    a wall structure comprising a main wall and at least one biasing member, wherein the main wall is configured to support and abut the second side of an electronic device, and the biasing member projects from the main wall and is configured to bias the electronic device away from the main wall, the biasing member configured to extend along and abut at least a portion of the second side of the electronic device;
    a hook structure configured to secure the electronic device, wherein the hook structure includes an end portion that is configured to support and abut at least a portion of the first side of the electronic device; and
    wherein the wall structure includes at least one lower attachment part that is configured to engage with a lower engagement part of the hook structure.

2. The electronic device holder of claim 1, wherein the biasing member is a projection that comprises an angled portion that extends laterally and downwardly from the main wall at an angle.

3. The electronic device holder of claim 2, wherein the projection further comprises a downward portion that extends from a lower end of the angled portion downwardly toward a lower support of the hook structure.

4. The electronic device holder of claim 1, wherein the biasing member is a bubble that extends along at least a portion of a longitudinal length of the wall structure.

5. The electronic device holder of claim 4, further comprising multiple bubbles that are spaced apart from each other along a longitudinal length of the wall structure by gaps that are aligned with gaps between hooks of the hook structure.

6. The electronic device holder of claim 1, wherein the biasing member is constructed out of a flexible material.

7. The electronic device holder of claim 6, wherein the flexible material is a rubber material.

8. The electronic device holder of claim 1, wherein the main wall, the biasing member, and the end portion of the hook structure comprises a rubber material.

9. The electronic device holder of claim 1, wherein the main wall and the biasing member are integrally formed.

10. The electronic device holder of claim 1, wherein the wall structure comprises multiple biasing members that are integrally formed with the main wall.

11. The electronic device holder of claim 1, wherein the hook structure comprises multiple hooks spaced apart from each other along a longitudinal length of the electronic device holder by a gap.

12. The electronic device holder of claim 1, wherein the hook structure comprises at least one hook that includes a vertical wall, an angled wall, and a base, wherein the vertical wall extends vertically between the base and the angled wall, wherein the angled wall extends upwardly and laterally inwardly toward the main wall of the wall structure, wherein the end portion is positioned at a top of the angled wall.

13. The electronic device holder of claim 1, wherein the main wall is configured to abut an upper portion of the electronic device along the second side of the electronic device, the end portion of the hook structure is configured to abut a middle portion of the electronic device along the first side of the electronic device, and the biasing member is configured to abut a lower portion of the electronic device along the second side of the electronic device.

14. The electronic device holder of claim 1, wherein the at least one electronic device holder is configured to secure the electronic device in either a portrait orientation or a landscape orientation.

15. The electronic device holder of claim 1, further comprising a wireless charger coupled to a portion of the electronic device holder.

* * * * *